(12) United States Patent
Nagpal et al.

(10) Patent No.: US 12,456,539 B2
(45) Date of Patent: Oct. 28, 2025

(54) METHOD AND SYSTEM FOR PREPARING KNOWLEDGEBASE OF MICROBES AND MICROBIAL FUNCTIONS HELPING REDUCING CANCER RISK

(71) Applicant: Tata Consultancy Services Limited, Mumbai (IN)

(72) Inventors: Sunil Nagpal, Pune (IN); Sharmila Shekhar Mande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 810 days.

(21) Appl. No.: 17/804,727

(22) Filed: May 31, 2022

(65) Prior Publication Data
US 2022/0392563 A1    Dec. 8, 2022

(30) Foreign Application Priority Data
Jun. 1, 2021    (IN) .............................. 202121024442

(51) Int. Cl.
G16B 5/20 (2019.01)
G06N 5/022 (2023.01)
G16B 40/00 (2019.01)

(52) U.S. Cl.
CPC .............. *G16B 5/20* (2019.02); *G06N 5/022* (2013.01); *G16B 40/00* (2019.02)

(58) Field of Classification Search
CPC .......... G16B 5/20; G16B 40/00; G16B 40/20; G16B 40/30; G16B 30/00; G16B 50/10; G06N 5/022
See application file for complete search history.

(56) References Cited

U.S. PATENT DOCUMENTS

2017/0270212 A1* 9/2017 Lavrenko ............... G16B 20/20
2021/0275602 A1* 9/2021 Robinson ........... C07K 16/2818
2021/0355546 A1* 11/2021 Poore ..................... C12Q 1/689

OTHER PUBLICATIONS

Li, Jun, et al. "Probiotics modulated gut microbiota suppresses hepatocellular carcinoma growth in mice." Proceedings of the National Academy of Sciences 113.9 (2016): pp. E1306-E1315 and Supporting Information (Year: 2016).*

(Continued)

*Primary Examiner* — Omar F Fernandez Rivas
*Assistant Examiner* — Michael C. Lee
(74) *Attorney, Agent, or Firm* — Finnegan, Henderson, Farabow, Garrett & Dunner, LLP

(57) ABSTRACT

Many microbes are capable of synthesizing anti-cancer products, however existing state of art is limited by focus on industrial production of the said products. A method and system for preparing a knowledgebase of microbes and microbial functions to identify good and bad microbes have been provided. The present disclosure therefore further describes methods and compositions for the risk assessment, prevention and management of various forms of cancer by using microbes, microbial products utilizing the knowledgebase of microbes and microbial function. The method is configured to priming the microbes inside the host for boosting the immune response against cancer initiation, progression, recurrence and associated side effects. The use of microbes and microbial products can be provided in the form of probiotics, supplements, and prebiotics etc. along with creation of right sets of nutrition conditions in the host for the proper functioning of the microbes and microbial products.

15 Claims, 22 Drawing Sheets

(56) References Cited

OTHER PUBLICATIONS

Han, Wontack, et al. "A repository of microbial marker genes related to human health and diseases for host phenotype prediction using microbiome data." Biocomputing 2019: Proceedings of the Pacific Symposium (2019), pp. 236-247 (Year: 2019).*

Van Santen, Jeffrey A., et al. "The natural products atlas: an open access knowledge base for microbial natural products discovery." ACS central science 5.11 (2019): pp. 1824-1833 (Year: 2019).*

McCoubrey, Laura E., et al. "Harnessing machine learning for development of microbiome therapeutics." Gut Microbes 13.1 (Jan. 30, 2021), pp. 1-20 (Year: 2021).*

Carrieri, Anna Paola, et al. "Explainable AI reveals changes in skin microbiome composition linked to phenotypic differences." Scientific reports 11.1 (Feb. 25, 2021), pp. 1-18 (Year: 2021).*

Westfall, Susan, et al. "Optimization of probiotic therapeutics using machine learning in an artificial human gastrointestinal tract." Scientific reports 11.1 (Jan. 13, 2021), pp. 1-15 (Year: 2021).*

Ruiz-Perez, Carlos A., et al. "MicrobeAnnotator: a user-friendly, comprehensive functional annotation pipeline for microbial genomes." BMC bioinformatics 22 (Jan. 6, 2021) (Year: 2021).*

Cozzo, Alyssa J. et al., "Dietary Energy Modulation and Autophagy: Exploiting Metabolic Vulnerabilities to Starve Cancer", Frontiers in Cell and Developmental Biology, Date: Nov. 2020, Publisher: NCBI, https://www.ncbi.nlm.nih.gov/pmc/articles/PMC7674637/pdf/fcell-08-590192.pdf.

Raskov, Hans et al., "Linking Gut Microbiota to Colorectal Cancer", Journal of Cancer, Date: Sep. 2017, vol. 8(17), pp. 3378-3395, Publisher: Nature, https://www.nature.com/articles/s41598-021-97342-z.pdf.

Morita, Mami et al., "Dietary intervention as a therapeutic for cancer", BMC Cancer, Date: Dec. 2020, Publisher: NCBI, https://www.ncbi.nlm.nih.gov/pmc/articles/PMC7893991/pdf/CAS-112-498.pdf.

Yu, Zi-Kun et al., "The role of the bacterial microbiome in the treatment of cancer", BMC Cancer, Date: Aug. 2021, Publisher: NCBI, https://www.ncbi.nlm.nih.gov/pmc/articles/PMC7893991/pdf/CAS-112-498.pdf.

* cited by examiner

METHOD AND SYSTEM FOR PREPARING KNOWLEDGEBASE OF MICROBES AND MICROBIAL FUNCTIONS HELPING REDUCING CANCER RISK

PRIORITY CLAIM

This U.S. patent application claims priority under 35 U.S.C. § 119 to: Indian Patent Application No. 202121024442, filed on Jun. 1, 2021. The entire contents of the aforementioned application are incorporated herein by reference.

TECHNICAL FIELD

The disclosure herein generally relates to the field of assessment and reduction of cancer risk, and, more particularly, to a method and system for preparing a knowledgebase of microbes and microbial function, wherein the knowledgebase is further configured to be used to assess and reduce the risk of cancer in the host by modulating stress response in host's microbiota.

BACKGROUND

Cancer is a serious disease claiming millions of lives every year across the world. The health complications associated with the disease are dilapidating physically, mentally, emotionally for both the diseased and the caretakers. Even the treatment regimens like chemotherapy and radiotherapy often employed for cancer, cause serious side effects in the patients. Importantly, most of the available surgically/chemically invasive treatment methods deteriorate the normal state of systemic health to such an extent that a reversal to normality is difficult to achieve even after the remission. The fear of relapse is always associated with any form of cancer.

Methods to identify microbes or microbial functions that can positively or negatively affect cancer are currently dependent on experimental correlation studies or observation of specific chemicals, compounds, metabolites that can directly inhibit cancer growth. Also, methods to prevent cancer initiation in healthy individuals are currently limited to use of a few products like nutrients or microbe or compounds. Different products are employed to prevent serious side effects of traditional treatment methods in cancer patients like thymosin, cerium oxide nanoparticles. Many of existing methods are costly, ignore competitive nature of microbes or involve use of inherently harmful products that need to be attenuated.

SUMMARY

Embodiments of the present disclosure present technological improvements as solutions to one or more of the above-mentioned technical problems recognized by the inventors in conventional systems. For example, in one embodiment, a system for preparing a knowledgebase of microbes and microbial function to reduce the risk of cancer in a person is provided. The system comprises a sample collection module, one or more hardware processors, and a memory. The sample collection module provides one or more microbial strains as probiotic to a cancer host and a non-cancer host. The memory is in communication with the one or more hardware processors, wherein the one or more first hardware processors are configured to execute programmed instructions stored in the memory, to: label the one or more microbial strains into one of a good strain or a bad strain based on an impact on health of the cancer host and the non-cancer host; perform, via a sequencer, a whole gene sequencing on the labelled good strain and the bad strains; perform functional annotations on sequenced good strain and the bad strain to get a good and bad microbes' functional database; filter the good and bad microbes' functional database using a combination of a plurality of keywords in their names and are expected to pertain to microbial competition traits and have implications directly or indirectly in inhibiting or promoting cancer progression in collateral to competitive nature of microbes, wherein the filtering results in generation of a labelled knowledgebase of good and bad microbes with competition linked functional units; perform genome clustering on the labelled knowledgebase of good and bad microbes using an unsupervised learning technique and validate if good and bad microbes are segregated on the basis of the competition linked functional units; generate using a supervised machine learning technique: a good microbe prediction model, a bad microbe prediction model, and functional units promoting the competition against cancer; learn a context whether a feature drives good microbe prediction or bad microbe prediction using Shapley additive explanations; creating the knowledgebase of microbes and microbial function from the labelled knowledgebase of good and bad microbes containing only good prediction driving functional units; receive an unknown microbe; identify a nature of the unknown microbe using the learned context; and store the knowledgebase of microbes and microbial function with the good microbes based on the identified nature.

In another aspect, a method for preparing a knowledgebase of microbes and microbial function to reduce the risk of cancer in a person is provided. Initially, one or more microbial strains are provided as probiotic to a cancer host and a non-cancer host. The one or more microbial strains are then labelled into one of a good strain or a bad strain based on an impact on health of the cancer host and the non-cancer host. Further, a whole gene sequencing is performed on the labelled good strain and the bad strains. In the next step, functional annotations are performed on sequenced good strain and the bad strain to get a good and bad microbes' functional database. In the next step, the good and bad microbes' functional database is filtered using a combination of a plurality of keywords in their names and are expected to pertain to microbial competition traits and have implications directly or indirectly in inhibiting or promoting cancer progression in collateral to competitive nature of microbes, wherein the filtering results in generation of a labelled knowledgebase of good and bad microbes with competition linked functional units. Further, genome clustering is performed on the labelled knowledgebase of good and bad microbes using an unsupervised learning technique and validate if good and bad microbes are segregated on the basis of the competition linked functional units. Then, a good microbe prediction model, a bad microbe prediction model, and functional units promoting the competition against cancer are generated using a supervised machine learning technique. In the next step, a context is learned whether a feature drives good microbe prediction or bad microbe prediction using Shapley additive explanations. Further, the knowledgebase of microbes and microbial function is created from the labelled knowledgebase of good and bad microbes containing only good prediction driving functional units. In the next step, an unknown microbe is received. A nature of the unknown microbe is then identified using the learned context. And finally, the good microbes based on the identified nature is stored in the knowledgebase of microbes and microbial function.

In yet another aspect, there are provided one or more non-transitory machine-readable information storage mediums comprising one or more instructions which when executed by one or more hardware processors cause preparing a knowledgebase of microbes and microbial function to reduce the risk of cancer in a person. Initially, one or more microbial strains are provided as probiotic to a cancer host and a non-cancer host. The one or more microbial strains are then labelled into one of a good strain or a bad strain based on an impact on health of the cancer host and the non-cancer host. Further, a whole gene sequencing is performed on the labelled good strain and the bad strains. In the next step, functional annotations are performed on sequenced good strain and the bad strain to get a good and bad microbes' functional database. In the next step, the good and bad microbes' functional database is filtered using a combination of a plurality of keywords in their names and are expected to pertain to microbial competition traits and have implications directly or indirectly in inhibiting or promoting cancer progression in collateral to competitive nature of microbes, wherein the filtering results in generation of a labelled knowledgebase of good and bad microbes with competition linked functional units. Further, genome clustering is performed on the labelled knowledgebase of good and bad microbes using an unsupervised learning technique and validate if good and bad microbes are segregated on the basis of the competition linked functional units. Then, a good microbe prediction model, a bad microbe prediction model, and functional units promoting the competition against cancer are generated using a supervised machine learning technique. In the next step, a context is learned whether a feature drives good microbe prediction or bad microbe prediction using Shapley additive explanations. Further, the knowledgebase of microbes and microbial function is created from the labelled knowledgebase of good and bad microbes containing only good prediction driving functional units. In the next step, an unknown microbe is received. A nature of the unknown microbe is then identified using the learned context. And finally, the good microbes based on the identified nature is stored in the knowledgebase of microbes and microbial function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
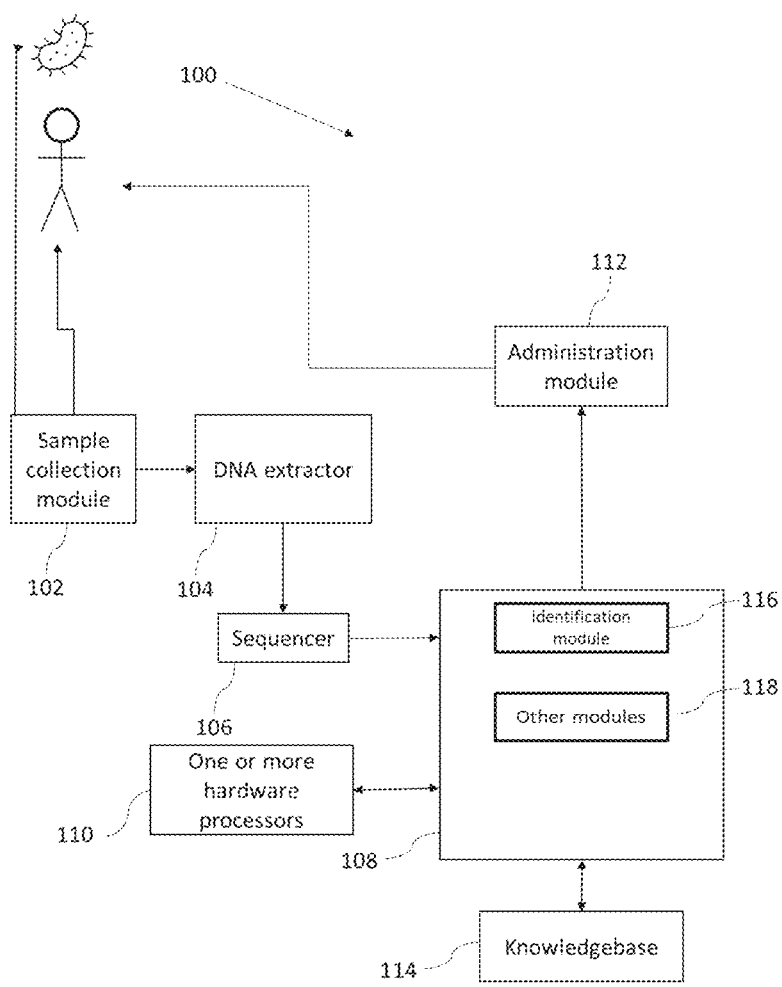
FIG. 1 is a block diagram of a system for preparing a knowledgebase of microbes and microbial function to reduce the risk of cancer in a person according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Many microbes are harmless to the human body and microbiota is often dubbed as another organ of the body. Microbes provide natural defense and improve immunity. However, right set of microbes need to be in present and right set of conditions for their growth (or inhibition) are needed to obtain health benefits from microbes and microbial products in the times of need (or to avoid the adverse times).

Many microbes are capable of synthesizing anti-cancer products, however existing state of art is limited by focus on industrial production of the said products, delivery of such products (like bacteriocins) inside the host (which is affected by biodegradation and proteolytic deactivation), use of the probiotics that focus on non-targeted cancer prevention (like improving general health of gut) or use of attenuated but otherwise potentially harmful microbes, and lack of attention to competitive trait in microbes for deriving health benefiting microbial cocktails and products, lack of attention to the choice of right host conditions (like state of nutrition) to prime or activate not only externally delivered cancer specific microbial compositions but also the specific microbes inside the host, and achieving in-vivo targeted anti-cancer response by facilitating host-microbiome-cancer crosstalk through nutritional fine tuning.

The present disclosure provides a method and system for preparing a knowledgebase of microbes and microbial functions to identify good and bad microbes, particularly for cancer related health in humans (can be extended to any living organism affected by cancer), basis the competitive traits of microbes is described here. This further aids in assessment of risk of cancer and in developing microbial compositions that can reduce cancer risk or progression by employing competitive traits of microbes. The present disclosure therefore further describes methods and compositions for the risk assessment, prevention and management of various forms of cancer by using microbes, microbial products utilizing the knowledgebase of microbes and microbial function. The method is configured to priming the microbes inside the host for boosting the immune response against cancer initiation, progression, recurrence and associated side effects. Here priming refers to the stimulation of microbes to express anti-cancer microbial products and pathways inside the host by sensing a state of stress and/or competition in the environment. The use of microbes and microbial products can be provided in the form of probiotics, supplements, and prebiotics etc. along with creation of right sets of nutrition conditions in the host for the proper functioning of the microbes and microbial products.

Referring now to the drawings, and more particularly to FIG. 1 through FIG. 17, where similar reference characters denote corresponding features consistently throughout the figures, there are shown preferred embodiments and these embodiments are described in the context of the following exemplary system and/or method.

According to an embodiment of the disclosure, a block diagram of a system 100 for annotating functions in microbes of consumed probiotic, preparing a knowledgebase of microbes and microbial function to reduce the risk of cancer in a person and further assessing and reducing the risk of cancer in the person is shown in FIG. 1. The system 100 consists of a sample collection module 102, a DNA extractor 104, a sequencer 106, a memory 108, one or more hardware processors (referred as a processor, herein after) 110 and an administration module 112 as shown in FIG. 1. The processor 110 is in communication with the memory 108. The memory 108 further includes a plurality of modules for performing various functions. For example, an identification module 116 and other modules 118 etc.

The system 100 comprises the DNA extractor 104 and the sequencer 106. DNA is first extracted from the microbial cells constituting the probiotic sample or microbiome sample using laboratory standardized protocols by employing the DNA extractor 104. Next, sequencing is performed using the sequencer 106 to obtain the sequenced metagenomic reads. The sequencer 106 performs whole genome shotgun (WGS) sequencing from the extracted microbial DNA, using a sequencing platform after performing suitable pre-processing steps (such as, sheering of samples, centrifugation, DNA separation, DNA fragmentation, DNA extraction and amplification, etc.).

According to an embodiment of the disclosure, the system 100 is configured to develop a knowledgebase of competition linked microbial functions, predict good and bad microbes, assess risk of cancer initiation/progression, assess immune system capability to defend against cancer, provide cancer risk assessment, prevent, and manage treatment, to improve efficiency of existing treatments and minimizing side effects of existing treatments of cancer. It should be appreciated that the system 100 can be used to predict good and bad microbes as well as manage cancer or tumors or uncontrolled cell growth diseases of various kinds as well as the side effects associated with the progression and treatment of these diseases. The present disclosure provides the method for cancer risk assessment and management application of at least one of microbiome, or microbiome-associated compounds i.e. proteins, metabolites or probiotics or antibiotics in conjugation with modulation of nutritional intake that can activate anti-cancer functions in such microbes for cancers of various types such as to the likes of breast cancer, cancers of gut, lung cancer. It should be appreciated that the system 100 and method of the present disclosure can be used as a companion method in addition to existing methods going on for cancer risk assessment and management. The method can be used for diagnosis or treatment of cancer without intervening the ongoing treatment or diagnosis. The method can also be employed to assess suitability of a probiotic in improving state of health by identifying good and bad microbes.

The method provides a risk assessment system and health state improving set of interventions for an affected individual or preventive measure for healthy individual through application of these methods involving various pre/probiotic compositions (or variations thereof) aimed at the modulation of the microbial targeted functioning against cancer cells and synergizing immune response, which plays an important role in controlling cancer, improving efficiency of existing therapies, preventing cancer and improving state of health.

According to an embodiment of the disclosure, the disclosure provides a solution that validates prediction of good and bad microbes using machine learning models based on competition enabling functions of microbes and also involves validating development of anti-cancer response in microbes as a result of stress from host state of diet intake and consumption/administration of microbial compositions/probiotics that can respond to the stress in such a way (through expression of microbial pathways and products) that cancer inhibition can take place. Use of prebiotic or dietary compositions or compounds coupled to the microbial compositions for mimicking the stress of diet intake modulation and managing abundance or function of specific host-microbes is also described.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
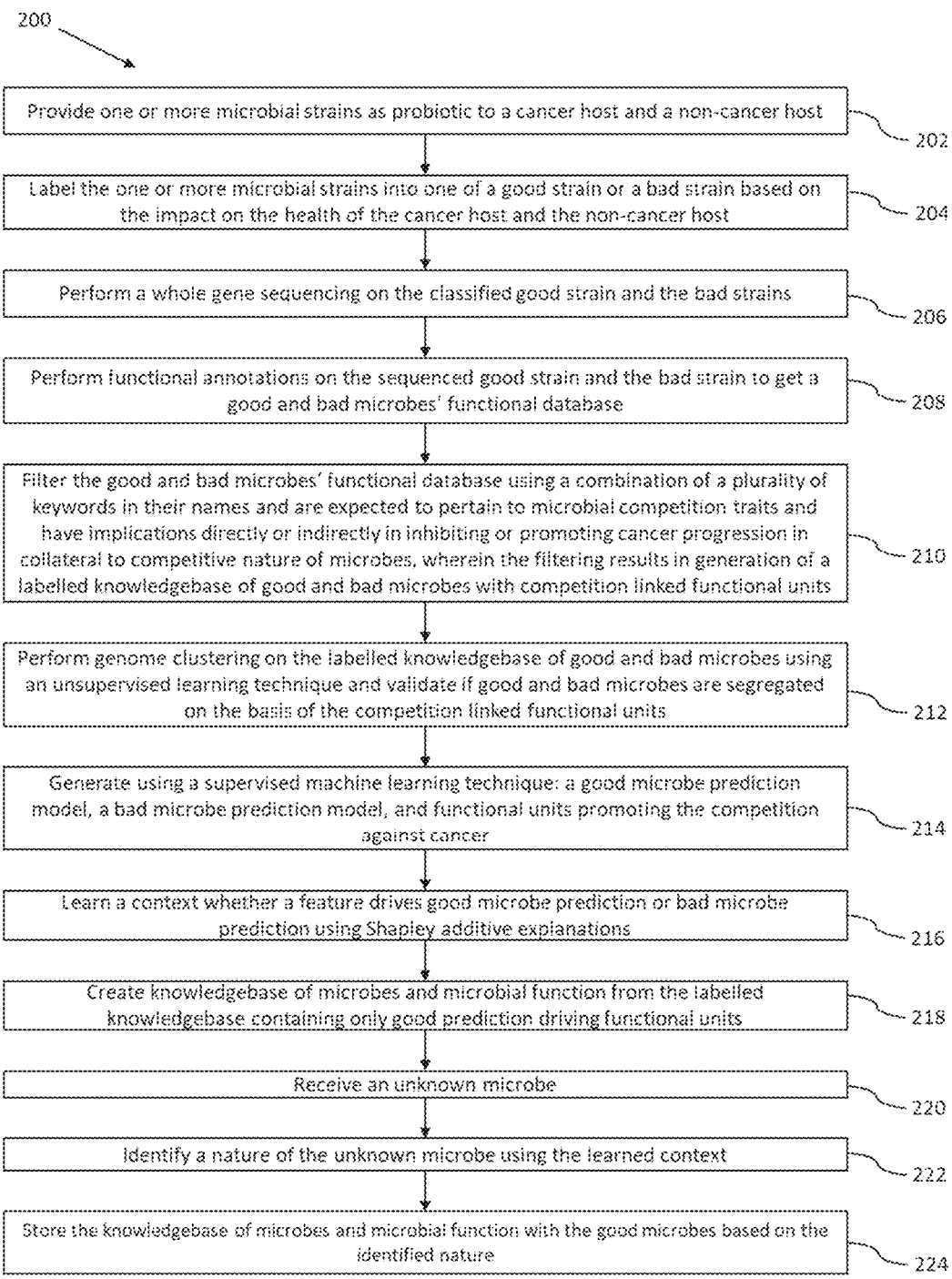
FIG. 2 is a flowchart illustrating the steps involved in a method for preparing a knowledgebase of microbes and microbial function to reduce the risk of cancer in a person according to some embodiments of the present disclosure.

In operation, a flow diagram of a method 200 for preparing a knowledgebase of microbes and microbial function, a predictor of good and bad microbes to reduce the risk of cancer in a person is shown in FIG. 2. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

FIG. 2 is a flowchart for preparing a knowledgebase of microbes and microbial function to reduce the risk of cancer in a person. The method is configured to prepare the knowledgebase and machine learning models (unsupervised and supervised) of microbes and microbial function to aid development of microbial compositions for reducing the risk of cancer, as well as to assess the risk as described in other embodiments of the disclosure. Initially at step 202, of the method 200, one or more microbial strains are provided as probiotic to a cancer host and a non-cancer host. At step 204, the one or more microbial strains are labelled into one of a good strain or a bad strain based on the impact on the health of the cancer host and the non-cancer host. The impact refers to cancer proliferation, symptomatic relief to the host, improved anti-inflammatory markers, anti-cancer or pro-oncogenic metabolites like short chain fatty acids, abundance of good microbes and abundance of good functions among more In the next step 206, a whole gene sequencing is performed on the classified good strain and the bad strains. At step 208, functional annotations are performed on the sequenced good strain and the bad strain to get a good and bad microbes' functional database.

At step 210 of the method 200, the good and bad microbes' functional database is filtered using a combination of a plurality of keywords in their names and are expected to pertain to microbial competition traits and have implications directly or indirectly in inhibiting or promoting cancer progression in collateral to competitive nature of microbes. The filtering results in generation of a labelled knowledgebase of good and bad microbes with competition linked functional units. The plurality of keywords comprises 'ABC', 'ocin', 'self-protect', 'polyphen', 'glucanase', 'sulfatase', 'stress', 'response', 'uptake', 'starvation', 'Branched-chain amino acid transport system', 'oxidoreductase', 'Antibiotic biosynthesis', 'glycoside hydrolase', 'toxin', 'biofilm', 'Mucin binding', 'spore', 'resist', 'secret'.

At step 212 of the method 200, genome clustering is performed on the labelled knowledgebase of good and bad microbes using an unsupervised learning technique and validate if good and bad microbes are segregated on the basis of the competition linked functional units. Further at step 214, a good microbe prediction model, a bad microbe prediction model, and functional units promoting the competition against cancer are generated using a supervised machine learning technique.

At step 216 of the method 200, a context is learnt whether a feature drives good microbe prediction or bad microbe prediction using Shapley additive explanations. It should be appreciated that any other method can also be used instead of shapley additive explanations for learning the context. At step 218 the knowledgebase of microbes and microbial function is created from the labelled knowledgebase of good and bad microbes containing only good prediction driving functional units.

In the next step 220, an unknown microbe is received as input. Further at step 222, a nature of the unknown microbe is identified using the learned context. And finally at step 224, the good microbes based on the identified nature is stored in the knowledgebase of microbes and microbial function.

Figure 3:
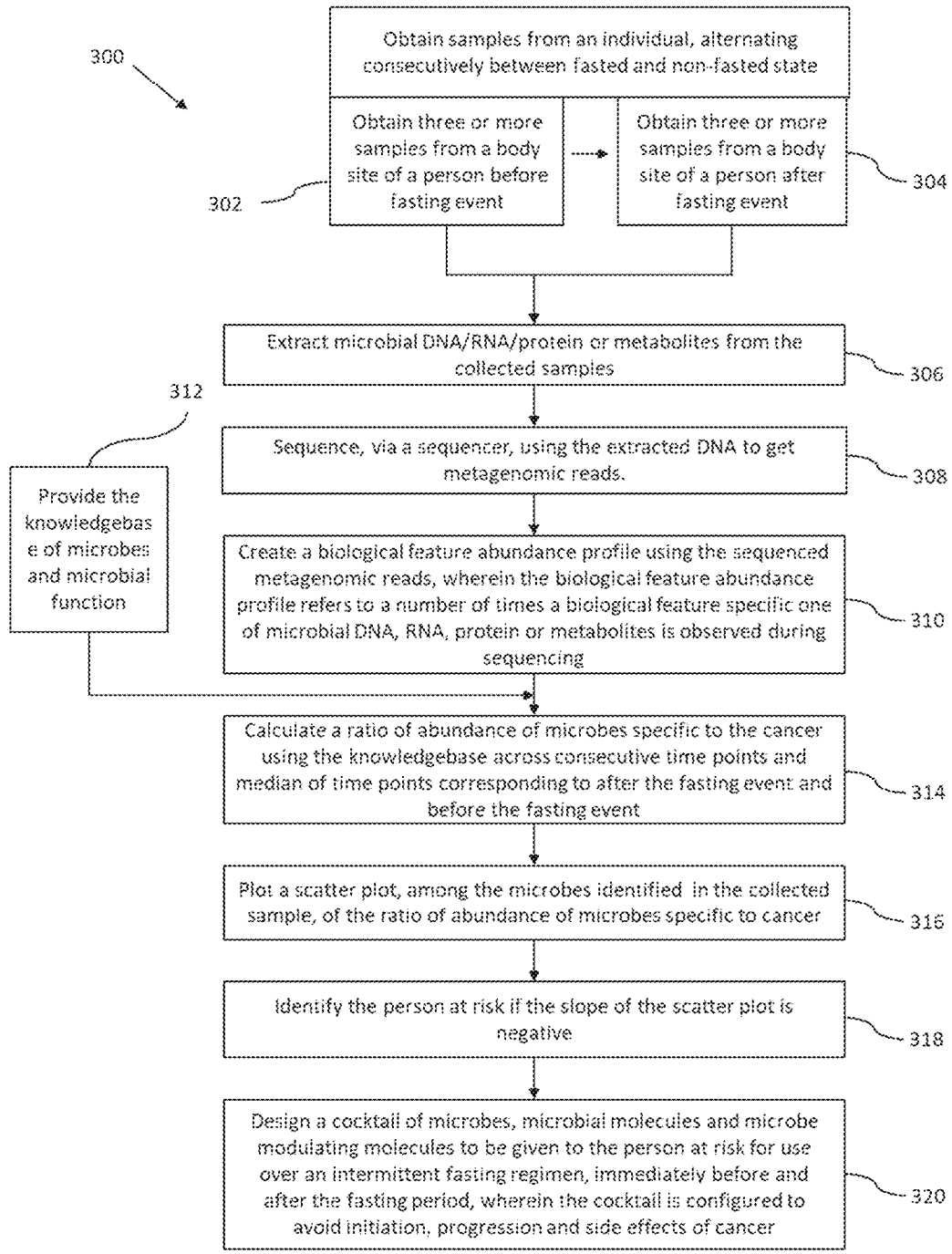
FIG. 3 is a flowchart illustrating the steps involved in a method for assessing and reducing the risk of cancer in the person according to some embodiments of the present disclosure.

According to an embodiment of the disclosure a flowchart for assessing and reducing the risk of cancer in the person using the knowledgebase of microbes and microbial functions is shown in FIG. 3. Initially at step 302 of method 300, three or more temporal samples are obtained from a body site of the person before fasting event, wherein samples refer to stool sample, tissue samples from various body sites (e.g. from tumor affected area or normal healthy tissue), a swab (e.g. oral swab), saliva and other samples of host from which microbial DNA or compounds or metabolites can be obtained; and temporal refers to the process of obtaining similar samples at different time points from the same individual. It should be appreciated that in another embodiment, only one sample can also be used for the further analysis. At step 304, three or more temporal samples are obtained from a body site of the same person after fasting event. In a clinical setting, samples are collected from a body site of a healthy or cancer affected individual across different time points (over few days/weeks/months or years), such that different time points oscillate between fasting and normal meal intake. For example, if t1 (time point 1) pertains to sample taken during normal diet intake before any fasting event, t2 (time point 2) should be after a fasting period (before the meal is taken).

In one embodiment, at least three samples are collected from fasting time points (i.e. three time points of fasting events) as well as normal time points (i.e. three time points of normal diet intake) if some statistical confidence in comparison is needed. In another embodiment, collection of single sample each from normal and fasting time points with lesser degree of confidence is well within the scope of this invention.

At step 306 of method 300 microbial DNA/RNA/protein or metabolites are extracted from the collected samples. At step 308, the extracted DNA is then sequenced to get sequenced metagenomic reads.

At step 310, a biological feature abundance profile is created using the sequenced metagenomic reads, wherein the biological feature abundance profile refers to the number of times a given biological feature specific biological material was observed in a sample.

In one of the embodiments, this biological material may be microbial DNA (e.g. 16S rDNA as obtained from techniques like amplicon sequencing) or whole metagenome sequence (as obtained from techniques like shotgun sequencing), commonly employed in metagenomic techniques. In another embodiment, the biological material may be microbial RNA as associated with techniques like transcriptomics. In yet another embodiment, the biological material may be the protein content of the sample as obtained from techniques like Mass spectrometry, HPLC, Chromatography etc. in proteomics. In yet another embodiment, any other biological material associated with microbes in the sample can be used.

In one of the embodiments, the biological features obtained from the biological material may correspond to the taxonomic characterization of microbes present in the sample (e.g. bacteria, fungi, and yeast). In another embodiment, the biological feature may correspond to the functional units of the microbes in the sample.

In one of the embodiments, the functional units may correspond to a gene, protein family, protein domain. In another embodiment, the functional unit may correspond to enzymes, metabolic pathways, or proteins or peptides.

In one embodiment, the protein or peptides may correspond to specific microbial proteins or peptides that help microbes to fight competition in the environment in which they live. Examples include but not limited to bacteriocins, toxins, antibiotics, non-ribosomal peptides. In another embodiment, the protein or peptides may correspond to specific microbial proteins or peptides that are known to have anti-cancer properties. Examples include but not limited to ribosomal peptides, non-ribosomal peptides, enzymes, toxins, antibiotics.

In one embodiment, the biological feature may correspond to metabolites detected in the sample. In one embodiment, the metabolites may correspond to specific metabolites that can cause stress to the microbes. Examples include but not limited to organic acids like Acetic acid, Butyric acid. In another embodiment, the metabolites may correspond to specific microbial metabolites that are known to have anti-cancer effects. Examples include but not limited to butyric acid, enterodiol, enterolactone, urolithins, equol and O-desmethylangolensin (DMA). In yet another embodiment, the metabolites may correspond to specific metabolites that are required as energy source for cancer proliferation. Examples include but not limited to acetic acid, branched chain amino acids, arginine, asparagine and polyamines.

The biological features are detected through use of DNA sequencing equipment (suitable for genes), techniques like mass spectrometry, chromatography (for proteins, peptides, metabolites), enzyme assays (for enzymes). Other techniques for detection of genes, proteins, peptides, enzymes, metabolites are well within the scope of the invention.

At step 312, a pre-created knowledgebase is provided. The knowledgebase is created using the knowledgebase creation module 114. The knowledgebase comprises microbes, their functional units and their meta-information. The functional units refer to the genes, proteins, peptides, protein families, protein domains, enzymes, pathways, metabolites relevant to microbial stress response as well as anti-cancer response. The microbes refer to the names of the microbial species in the knowledgebase, whose genomes are identified to have potential for anti-cancer response under dietary stress. The meta-information refers to the pathogenicity, motility, animal inhabitability and human inhabitability nature of the micro-organisms.

At step 314, a ratio of abundance of microbes is calculated specific to the cancer using the knowledgebase across consecutive time points and median of time points corresponding to after the fasting event and before the fasting event. At step 316, a scatter plot is plotted, among the microbes identified in the collected sample, of the ratio of abundance of microbes specific to cancer. Further at step 318, the person is identified at risk if the slope of the scatter plot is negative And finally, at step 320, a cocktail of microbes, microbial molecules and microbe modulating molecules is designed to be given to the person at risk for use over an intermittent fasting regimen, immediately before and after the fasting period, wherein the cocktail is configured to avoid initiation, progression and side effects of cancer.

Figure 4:
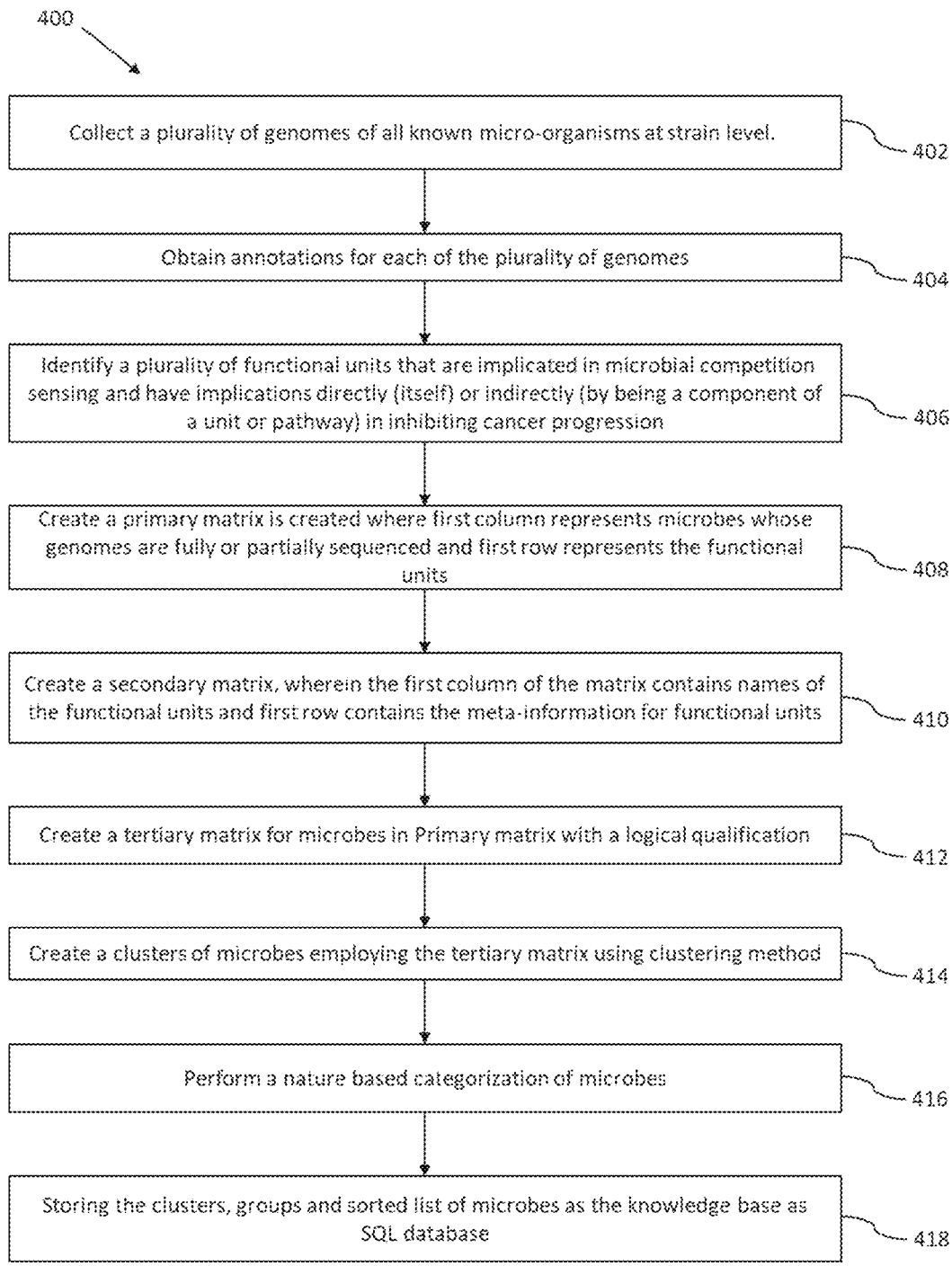
FIG. 4 shows a flowchart illustrating the steps involved in creation of a second knowledgebase to be used by the system of FIG. 1 according to some embodiments of the present disclosure.

According to another embodiment of the disclosure, a flowchart 400 illustrating the steps involved in the creation of a second knowledge base is shown in FIG. 4. The second knowledgebase is created using both labelled and unlabeled genomes. In another embodiment, the second knowledgebase can also be used for assessing and reducing the risk of cancer in the person. Initially at step 402, a plurality of genomes of all known micro-organisms at strain level are collected. Further at step 404, annotations are obtained for each of the plurality of genomes, wherein the annotations are obtained from tools and databases such as INTERPRO, UNIPROT, PATRIC, EBI, IMG/JGI-M, KEGG, NCBI, DAVID and STRING. Use of any other tools and methods for microbial genome annotation is well within the scope of this disclosure. At step 406, a plurality of functional units is identified that are implicated in microbial competition sensing and have implications directly (itself) or indirectly (by being a component of a unit or pathway) in inhibiting cancer progression using the identification module 116. The examples of the plurality of function units are genes, proteins, protein families, protein domains, enzymes, pathways, metabolites etc.

In one embodiment, the protein or peptides may correspond to specific microbial proteins or peptides that help microbes to fight competition in the environment in which they live. Examples include but not limited to bacteriocins, toxins, antibiotics, non-ribosomal peptides. In another embodiment, the protein or peptides may correspond to specific microbial proteins or peptides that are known to have anti-cancer properties. Examples include but not limited to ribosomal peptides, non-ribosomal peptides, enzymes (e.g. arginine deaminase, 1-asparaginase), toxins, antibiotics.

In one embodiment, the pathways may correspond to participation of specific metabolites that can cause stress to the microbes. Examples include but not limited to organic acids like Acetic acid metabolism, Butyric acid metabolism. In another embodiment, the pathways may correspond to specific microbial metabolites that are known to have anti-cancer effects. Examples include but not limited to metabolism of butyric acid, enterodiol, enterolactone, urolithins, equol and O-desmethylangolensin (DMA). In yet another embodiment, the pathways may correspond to specific pathways that can affect energy sources required for cancer proliferation. Examples include but not limited to metabolism and uptake of acetic acid, branched chain amino acids, arginine, asparagine and polyamines.

In one embodiment, known and unknown functional units are collated using sequence similarity search, structural similarity and gene context search against the protein families and genes corresponding to the cancer inhibiting microbial products. Known functional units refer to those units whose annotation is available publicly in the sequenced microbial genomes. Unknown units are those which currently have not been annotated in the publicly available genome sequences.

The identification module 116 performs functional unit identification in 4 stages:
 (i) Mining of databases namely INTERPRO, UNIPROT, PATRIC, EBI, IMG/JGI-M, KEGG, NCBI, DAVID, BACTIBASE and STRING for all known functions. It should be appreciated that use of any other databases is well within the scope of this disclosure.
 (ii) Filtering functions pertaining to microbial response to competition and stress.

In one embodiment, the functions correspond to specific microbial proteins or peptides that are known to help microbes to fight competition in the environment in which they live. Examples include but not limited to bacteriocins, toxins, antibiotics, non-ribosomal peptides. In another embodiment, the functions correspond to specific microbial proteins or peptides that are known to have anti-cancer properties. Examples include but not limited to ribosomal peptides, non-ribosomal peptides, enzymes (e.g. arginine deaminase, 1-asparaginase), toxins, antibiotics. In yet another embodiment, the functions correspond to specific pathways and metabolites that can cause stress to the microbes. Examples include but not limited to organic acids like Acetic acid metabolism, Butyric acid metabolism. In still another embodiment, the functions correspond to specific microbial metabolites that are known to have anti-cancer effects. Examples include but not limited to metabolism of butyric acid, enterodiol, enterolactone, urolithins, equol and O-desmethylangolensin (DMA). In still another embodiment, the functions correspond to specific pathways that can affect energy sources required for cancer proliferation. Examples include but not limited to metabolism and uptake of acetic acid, branched chain amino acids, arginine, asparagine and polyamines.

In one embodiment, unknown functional units are also collected using sequence similarity search, structure similarity search and gene context or gene neighborhood search against the annotated functions in all genomes of microorganisms. Known functional units refer to those units whose annotation is available publicly in the sequenced microbial genomes. Unknown units are those which currently have not been annotated in the publicly available genome sequences. Use of all microbial genomes in HMMER and BLAST for identification of unknown or unannotated functions is within the scope of the invention.
 (iii) Mining literature from Pubmed using Pubtator and pubmedmineR to identify functions related to microbial stress response as well as anti-cancer response and adding to the repertoire of functions identified till step 2 by filtering out eukaryotic species in the results of pubtator_function( ) of pubmed.mineR. The use of any other databases like Pubmed and tools like Pubtator or pubmedmineR for data processing is also well within the scope of this disclosure.
 (iv) In the stage four of function identification, manual curation of literature is done to identify functional units associated with microbial stress response, competition sensing as well as those having anti-cancer properties.

Further at step 408, a primary matrix is created where first column represents microbes whose genomes are fully or partially sequenced and first row represents the functional units. The cells of the matrix represent values corresponding to abundance of such functional units in genomes of various microbes. The abundance of units in genomes refers to the count of annotations available for each unique functional unit in public databases namely INTERPRO, UNIPROT, PATRIC, EBI, IMG/JGI-M, KEGG, BACTIBASE, NCBI, DAVID and STRING for the microbial genomes. Though use of any other public or paid databases is well within the scope of this disclosure. In addition, abundance of unannotated units is also present. Number of unannotated genes or protein domains in genomic neighborhood of annotated genes or protein domains are also considered. The first row also contains features corresponding to the meta-information of the microbes e.g. pathogenicity, gram nature, inhabitability in animals, inhabitability in humans, motility, total stress response function units, total anti-cancer function units, number of unique stress response function units, number of unique anti-cancer function units.

In one embodiment, other chemical, physical and morphological characteristics of microbes are also included in the meta-information.

Further at step 410, a secondary matrix is created wherein the first column of the matrix contains names of the functional units and first row contains the meta-information for functional units. Meta-information tags for functional units refer to the type of functional unit (gene, protein, enzyme, metabolite, pathway etc.), regulatory or non-regulatory nature of functional unit and type of cancer each functional unit is associated with.

Values corresponding to pathogenicity, gram nature, human inhabitability, type of cancer, regulatory or non-regulatory nature, type of functional unit are one-hot-encoded to enable compatibility of their information embedding with quantitative counts or abundance of functional unit information in the matrix. Type of cancer and type of functional unit requires multi label binarizer such that each cancer type and each functional unit type gets a different binary classification for each functional unit.

Further at step 412, a tertiary matrix is created for microbes in Primary matrix with following logical qualification:

TSFu>0 OR TCFu>0; where TSFu is Total Stress response functional units and TCFu is Total anti-Cancer Functional units Further at step 414, clusters of microbes are created employing the tertiary matrix using clustering methods. Clustering methods include but not limited to hierarchical clustering, topic modeling, mixture models, employing the abundance values. Though use of any other clustering method is well within the scope of this disclosure.

Further at step 416, nature based categorization of microbes is performed. Nature refers to type of functional units, type of cancer and other categories of functional units and microbes as available in primary and secondary matrix. Microbes with ability to have anti-cancer activity are identified and sorted according to the total approximate potential defined by the meta-information of microbes and functional units.

In one embodiment, the use of meta-information refers to the unique anti-cancer functional units and unique stress response functional units. Microbes are sorted according to the value of product of number of unique anti-cancer function units and number of unique stress response function units. In another embodiment, the use of meta-information refers to the total anti-cancer function units and total stress response function units. Microbes are sorted according to the value of the product of total anti-cancer function units and total stress response function units.

In one embodiment, microbes are filtered according to the cancer type, before sorting according the meta-information. In another embodiment, the microbes are filtered according to the type of function units present in them before sorting according to the meta-information.

In one embodiment, a machine learning classifier is developed using the known anti-cancer potential of the microbes in primary matrix and their function unit value data from primary matrix. This classifier segregates microbes between 'anti-cancer' and 'non anti-cancer' class based on the functional unit data in the primary matrix. The microbes classified as 'anti-cancer' microbes are sorted according to the meta-information. In one embodiment, pathogenic microbes are not stored as a separate group.

In one embodiment, microbes specific to the type of the host inhabitability (e.g. human inhabitability) are stored as separate group. Finally, at step 418, the clusters, groups and sorted list of microbes is stored as the second knowledge base as SQL database. Other forms of knowledgebase compilation and storage are well within the scope of the invention. The knowledge base additionally serves the creation of a digital model of host-microbe-cancer crosstalk or interaction According to an embodiment of the disclosure, exemplary compositions 1 to 10 are designed, these exemplary compositions are provided in the later part of the disclosure. Exemplary compositions 1-10 present important cancer specific non-pathogenic compositions derived from the total matrix. Other compositions are possible using one or more of the pathogenic/non-pathogenic microbes. Composition 1-10 present sample designs of compositions that can be used before and after each fasting period in a fasting regimen to avoid initiation, progression and side effects of various forms of cancer (and side effects of cancer treatment options) in healthy or cancer effected subjects. Use of these compositions is subject to the observation of statistically significant increase in abundance of non-pathogenic anti-cancer biological features or a decrease in abundance of non-pathogenic anti-cancer biological features or an increase in abundance of pathogenic biological features.

According to an embodiment of the disclosure, the compositions can be of two types (1) Supported (2) Self-sustaining, wherein supported compositions aim at accelerated priming or activation of general stress response (GSR) in microbes of administered cocktail as well as microbes inside the host and inside the host's tumor or cancer. The priming refers to the stimulation of microbes to express anti-cancer microbial products and pathways inside the host by sensing a state of stress and/or competition in the environment. The priming is achieved using inducers of general stress response like Acetic acid, butyric acid (considered safe for human consumption or for different modes of prebiotic consumption e.g. rectal infusions). Other organic acids and metabolites that can prime the general stress response of microbes are very well within the scope of the design of compositions. Composition 1, 3, 5, 7 and 9 are examples of such designs composed using the knowledge-base. Self-sustaining compositions aim to administer microbes that can accelerate production of organic acids in the host, stabilize inside the host and sustain an unsupported priming of general stress response in the other constituting microbes of the cocktail. Composition 2, 4, 6, 8, and 10 are examples of such designs.

In addition to the oral consumption as a prebiotic/probiotic the compositions can be applied to site of cancer using any of the well-known method in the art for the application. Various methods are provided in the later part of the disclosure.

According to an embodiment of the disclosure, the cancer risk assessment and management solution works as follows: Microbial makeup of the subject is identified. Microbial make up refers to the microbes present and functions performed by them. Based on the identification, a risk assessment is done and need for use of beneficial microbes or microbe modulating compounds is assessed. Microbes are delivered to the host. Host is subjected to fasting to create an event of stress for the delivered and resident microbes. Stress activates general and stringent stress response (SSR) in bacteria. Single event of fasting will not generate sufficient and consistent response, multiple intermittent events of microbial composition delivery and subsequent observation of fasting is needed. Prebiotic supported composition can help accelerate microbial response in each fasting event. After multiple events of fasting, prebiotic support is not essential to accelerate anti-cancer response when self-sustaining composition is used. Further the method 200 of the present disclosure can be used as a companion method in addition to existing methods going on for cancer risk assessment and management. The method can be used for diagnosis or treatment of cancer without intervening the ongoing treatment or diagnosis.

According to an embodiment of the disclosure, the cancer risk assessment and management solutions can be applied in at least one of the following forms:

As topical ointment to be applied on exposed surfaces vulnerable to cancer or affected by cancer, in form of paste/liquid/gel/powder As a spray, roller or other form of application involving delivery of a layer on top of the affected site As an injection Probiotic and prebiotic supplements (microbes/microbial products/chemicals) which can be in form of drinks and which boosts the population of the intended microbes Any other mode of delivery other than above mentioned which would be applicable to affected and/or unaffected subjects A digital twin of the microbial cancer micro-environment can be created using the knowledgebase According to an embodiment of the disclosure, the alternate implementations include:

Applying microbial cancer management interventions without coupling with fasting to employ production of anti-cancer microbial products within the host by the host microbiota or microbes delivered to host for this purpose.

Any other pathway associated with anti-cancer response, which can be similarly modulated using microbiome-based interventions and dietary interventions, based on a differential status between fasting and non-fasting state Geography/ethnicity/climate/treatment method/diet/age etc. based differential treatment for individuals based on the cancer risk assessment and management requirement identified by the system According to an embodiment of the disclosure, the method 300 can also be explained with the help of an example as follows.

A sample is taken from a subject for microbiome assessment (sample can be stool, saliva, swab, biopsy and any other body site sample). The person goes for an event of fasting frequently adopted in the culture immediately after giving the sample (this sample is tagged as non-fasted sample). Immediately before taking a meal after fasting, another sample is taken (this sample is tagged as fasted state sample). This process is repeated over a period of time until 3 or more samples are obtained for both 'non-fasted and fasted states'. Assessment of abundance of anti-cancer responses of microbes (e.g. bacteriocin production, SCFA production, toxins, non-ribosomal peptides, polyamine metabolism etc.) and anti-cancer microbes (example listed in Compositions 1-10) as prepared in the knowledgebase developed (described earlier) is done. Based on the ratios obtained for samples belonging to fasted and non-fasted state, a risk assessment is done, and a probiotic/prebiotic composition is designed. A subject pertaining to a specific cancer type can undergo a specific assessment and administration of a composition specific to the design meant for the said cancer type. The person can utilize this as a companion method in addition to existing methods going on for cancer risk assessment and management.

In an example, following microbes can be used as probiotic composition before fasting event or with a meal, coupled with intake of prebiotic organic acids during the event of fasting:

Composition 1—GSR primer support composition:

The composition is called so, as it is intended to accelerate microbial stress response by use of the organic acids during the event of nutrient stress of fasting to support the elicitation of general stress response.

Butyric acid, Acetic acid, *Enterococcus faecium, Lactococcus lactis, Escherechia coli, Klebsiella penumoniae, Pediococcus acidilactici, Streptococcus bovi, Lactobacillus plantarum, Mycobacterium smegmatis, Brevibacillus* sp., *Streptomyces griseoluteus, Lactobacillus casei.*

Administration of the composition 1 is done repeatedly for each intermittent fasting event that follows until one or more of these microbes have sustained in the host to yield higher abundance in a fasting event as compared to a non-fasting event across multiple time points post cessation of composition administration. The composition is aimed at any tumor type for a systemic anti-cancer response.

Composition 2:

Following composition can be used for an efficient self-sustainable response of higher in-vivo production of organic acids along with the anti-cancer response contributed by the microbes of above composition. An immediate or accelerated response cannot be expected for this composition, but a response after long term sustenance of the composite microbes:

*Bifidobacterium longum, Bifidobacterium bifidum, Bacteroides thetaiotaomicron, Faecalibacterium prausnitzii, Lactobacillus acidophilus, Lactobacillus gasseri, Lactobacillus rhamnosus, Lactobacillus salivarius, Lactobacillus agilis, Enterococcus faecium, Lactococcus lactis, Escherechia coli, Klebsiella penumoniae, Pediococcus acidilactici, Streptococcus bovi, Lactobacillus plantarum, Mycobacterium smegmatis, Brevibacillus* sp., *Streptomyces griseoluteus, Lactobacillus casei*

Administration of the composition (composition 2) is done repeatedly for each intermittent fasting event that follows until two or more of these microbes have sustained in the host to yield higher abundance in a fasting event as compared to a non-fasting event across multiple time points post cessation of composition administration. The composition is aimed at any tumor type for a systemic anti-cancer response. For self-sustaining composition to work effectively, one of the microbes that have stabilized must pertain to one or more of the *Bifidobacterium longum, Bifidobacterium bifidum, Bacteroides thetaiotaomicron, Faecalibacterium prausnitzii, Lactobacillus acidophilus, Lactobacillus gasseri, Lactobacillus rhamnosus, Lactobacillus salivarius, Lactobacillus agilis* or any other short chain organic acid producer.

Other case specific compositions designed using the knowledgebase are as follows:

Composition 3: (GSR Primer Support Composition for Lung Cancer)

Butyric acid, Acetic acid, *Streptomyces caespitosus, Brevibacillus laterosporus, Rapidithrix thailandica, Bacillus licheniformis, Streptomyces griseoluteus, Mechercharimyces asporophorigenens*

Composition 4: (Self-Sustaining Composition for Lung Cancer)

*Bifidobacterium longum, Bifidobacterium bifidum, Bacteroides thetaiotaomicron, Faecalibacterium prausnitzii, Lactobacillus acidophilus, Lactobacillus gasseri, Lactobacillus rhamnosus, Lactobacillus salivarius, Lactobacillus agilis, Streptomyces caespitosus, Brevibacillus laterosporus, Rapidithrix thailandica, Bacillus licheniformis, Streptomyces griseoluteus, Mechercharimyces asporophorigenens*

Composition 5: (GSR Primer Support Composition for Breast Cancer)

Butyric acid, Acetic acid, *Streptomyces peucetius, Streptomyces caespitosus, Streptococcus pneumoniae, Mechercharimyces asporophorigenens, Verrucosispora fiedleri, Lactococcus lactis, Streptococcus bovis, Pediococcus acidilactici, Brevibacillus laterosporus*

Composition 6: (Self-Sustaining Composition for Breast Cancer)

*Bifidobacterium longum, Bifidobacterium bifidum, Bacteroides thetaiotaomicron, Faecalibacterium prausnitzii, Lactobacillus acidophilus, Lactobacillus gasseri, Lactobacillus rhamnosus, Lactobacillus salivarius, Lactobacillus agilis,*

*Streptomyces peucetius, Streptomyces caespitosus, Streptococcus pneumoniae, Mechercharimyces asporophorigenens, Verrucosispora fiedleri, Lactococcus lactis, Streptococcus bovis, Pediococcus acidilactici, Brevibacillus laterosporus*

Composition 7: (GSR Primer Support Composition for Cancer of Gut)

Butyric acid, Acetic acid, *Streptomyces peucetius, Streptomyces caespitosus, Pediococcus acidilactici, Salinispora arenicola, Halobacillus litorali, Bacillus licheniformis, Nocardiopsis lucentensis, Verrucosispora fiedleri, Mechercharimyces asporophorigenens, Enterococcus faecalis*

Composition 8: (Self-Sustaining Composition for Cancer of Gut)

*Bifidobacterium longum, Bifidobacterium bifidum, Bacteroides thetaiotaomicron, Blautia hydrogentrophica, Lactobacillus casei, Lactobacillus plantarum, Akkermansia muciniphilia, Coprococcus catus, Coprococcus comes, Coprococcus eutactus, Clostridium symbiosum, Dalister succinatiphilus, Eubacterium rectale, Eubacterium hallii, Faecalibacterium prausnitzii, Lactobacillus acidophilus, Lactobacillus gasseri, Lactobacillus rhamnosus, Lactobacillus salivarius, Lactobacillus agilis, Megasphaera elsdenii, Phascolarctobacterium succinatutens, Roseburia intestinalis, Roseburia inulinivorans, Streptomyces peucetius, Streptomyces caespitosus, Pediococcus acidilactici, Salinispora arenicola, Halobacillus litorali, Bacillus licheniformis, Nocardiopsis lucentensis, Verrucosispora fiedleri, Mechercharimyces asporophorigenens, Enterococcus faecalis*

Composition 9 (GSR Primer Support Composition for Cancer of Excretory System)

Butyric acid, Acetic acid, *Enterococcus faecalis, Brevibacillus laterosporu, Streptomyces caespitosus, Streptomyces peucetiu, Actinomyces antibioticus*

Composition 10 (Self-Sustaining Composition for Cancer of Excretory System)

*Bifidobacterium longum, Bifidobacterium bifidum, Bacteroides thetaiotaomicron, Faecalibacterium prausnitzii, Lactobacillus acidophilus, Lactobacillus gasseri, Lactobacillus rhamnosus, Lactobacillus salivarius, Lactobacillus agilis, Enterococcus faecalis, Brevibacillus laterosporu, Streptomyces caespitosus, Streptomyces peucetiu, Actinomyces antibioticus*

Propionic acid and other organic acids not harmful to health of the subject organism (e.g. human) can also be used in GSR primer support compositions.

According to an embodiment of the disclosure following keyword list is used: 'abc', 'ocin', 'self-protect', 'polyphen', 'glucanase', 'sulfatase', 'stress', 'response', 'uptake', 'starvation', 'Branched-chain amino acid transport system', 'oxidoreductase', 'antibiotic biosynthesis', 'glycoside hydrolase', 'toxin', 'biofilm', 'Mucin binding', 'spore', 'resist', 'secret'.

FIG. 5 to FIG. 9C show the validations of the unsupervised and supervised machine learning models developed using 'competitive trait fetching' keyword combination disclosed in the keyword List. The validation involved exploring the potential signature of differentiation between good and bad microbes using only the competition linked functional units using unsupervised machine learning. To this end, tSNE was employed on PFAM (protein family) based functional characterizations of all known (fully sequenced) strains of following good microbial groups (genera or species)

'*Akkermansia muciniphila*', '*Bifidobacterium*', '*Lactococcus*', '*Faecalibacterium*', '*Lactobacillus*', '*Pediococcus*', '*Streptococcus thermophilus*', '*Propionibacterium freudenreichfii*', '*Streptococcus salivarius*', '*Pseudoxanthomonas*', '*Saccharopolyspora*', '*Streptomyces*', '*Ruminococcus*', '*Roseburia*', '*Blautia*', '*Butyrivibrio*', '*Coprococcus*', '*Methylobacter*'

Strains of all following bad microbial groups were also used for the tSNE—'*Fusobacterium*', '*Bacteroides fragilis*', '*Helicobacter pylori*', '*Streptococcus gallolyticus*', '*Campylobacter jejuni*', '*Staphylococcus aureus*', '*Enterococcus hirae*', '*Chlamydia pneumoniae*', '*Mycoplasma*', '*Borrelia burgdorferi*', '*Helicobacter bilis*', '*Helicobacter felis*', '*Cutibacterium acnes*', '*Salmonella enterica*'

A total of 2112 microbial strains were used altogether with 404 protein families (pertaining to competition linked functions) mapped by the Keyword List out of more than 19000 globally known protein families. The 404 protein families identified are:

pfam15432, pfam11181, pfam05977, pfam02381,
pfam01338, pfam09392, pfam04612, pfam08176,
pfam12528, pfam15937, pfam11887, pfam18927,
pfam09482, pfam06254, pfam15647, pfam06511,
pfam06812, pfam13669, pfam15523, pfam10566,
pfam00420, pfam15540, pfam03693, pfam03596,
pfam14028, pfam13536, pfam08843, pfam11319,
pfam09578, pfam18364, pfam14013, pfam08334,
pfam11903, pfam12734, pfam05099, pfam04221,
pfam19858, pfam00582, pfam00662, pfam13939,
pfam02673, pfam08178, pfam17898, pfam15723,
pfam00263, pfam17508, pfam12974, pfam12831,
pfam03845, pfam01320, pfam08998, pfam15521,
pfam13304, pfam17541, pfam13958, pfam13940,
pfam16873, pfam15919, pfam05818, pfam15637,
pfam01566, pfam01721, pfam02730, pfam10798,
pfam13801, pfam10412, pfam00188, pfam10753,
pfam16483, pfam16996, pfam12344, pfam10636,
pfam03848, pfam09671, pfam10799, pfam09551,
pfam02501, pfam00175, pfam05199, pfam03515,
pfam15531, pfam00482, pfam00507, pfam06182,
pfam09547, pfam18895, pfam10661, pfam15530,
pfam18312, pfam03807, pfam02554, pfam12679,
pfam17965, pfam15532, pfam05187, pfam04879,
pfam16583, pfam15656, pfam10140, pfam04365,
pfam12639, pfam10671, pfam06755, pfam09907,
pfam05431, pfam15649, pfam12910, pfam09819,
pfam01375, pfam07591, pfam18357, pfam05157,
pfam16942, pfam14707, pfam15537, pfam13018,
pfam05016, pfam16514, pfam01123, pfam06472,
pfam13296, pfam05707, pfam06541, pfam09546,
pfam11203, pfam09691, pfam06257, pfam06537,
pfam10628, pfam09683, pfam16141, pfam14384,
pfam16884, pfam18449, pfam02586, pfam10741,
pfam13515, pfam15657, pfam03992, pfam05108,
pfam10589, pfam01059, pfam02794, pfam15607,
pfam09221, pfam05275, pfam09828, pfam01514,
pfam04386, pfam14864, pfam04069, pfam00724,
pfam04632, pfam18807, pfam05591, pfam10062,
pfam13385, pfam12730, pfam00950, pfam05936,
pfam15646, pfam12441, pfam02534, pfam07992,
pfam16932, pfam11122, pfam05816, pfam01061,
pfam14323, pfam18565, pfam01593, pfam03404,
pfam15636, pfam01475, pfam15543, pfam15542,
pfam00005, pfam03323, pfam09857, pfam02537,
pfam14113, pfam07336, pfam04014, pfam09621,
pfam13957, pfam19409, pfam10614, pfam13722,
pfam02578, pfam16695, pfam10588, pfam03077,
pfam15641, pfam08817, pfam02918, pfam13738,
pfam09580, pfam00070, pfam03109, pfam01266,
pfam06154, pfam13338, pfam13956, pfam15650, pfam18495, pfam01855, pfam08951, pfam15605, pfam02608, pfam01314, pfam00148, pfam09326, pfam10757, pfam02653, pfam04259, pfam12486, pfam16943, pfam16326, pfam05504, pfam02452, pfam11356, pfam11183, pfam07927, pfam00884, pfam12700, pfam03781, pfam07968, pfam13327, pfam10685, pfam14021, pfam17312, pfam15604, pfam05791, pfam15933, pfam13346, pfam06953, pfam09480, pfam09204, pfam03318, pfam13437, pfam07194, pfam05947, pfam07655, pfam00384, pfam05071, pfam06744, pfam03203, pfam18276, pfam06414, pfam05946, pfam12468, pfam02852, pfam05015, pfam16989, pfam09548, pfam05101, pfam17001, pfam16935, pfam15935, pfam12367, pfam15524, pfam07017, pfam04518, pfam02876, pfam19824, pfam03883, pfam09407, pfam14863, pfam10899, pfam15653, pfam04187, pfam17555, pfam12698, pfam12256, pfam08845, pfam09957, pfam03507, pfam09386, pfam03498, pfam00072, pfam00893, pfam09850, pfam12293, pfam15970, pfam03886, pfam05364, pfam00174, pfam06296, pfam03958, pfam10648, pfam11663, pfam15731, pfam05711, pfam16296, pfam13376, pfam02410, pfam04066, pfam04888, pfam06958, pfam04655, pfam12891, pfam12790, pfam07996, pfam06146, pfam08988, pfam15529, pfam15943, pfam16754, pfam00437, pfam07254, pfam18158, pfam15648, pfam05229, pfam03945, pfam06039, pfam19034, pfam17147, pfam06558, pfam12848, pfam06996, pfam03433, pfam09818, pfam18564, pfam17194, pfam04392, pfam09867, pfam00903, pfam15738, pfam09581, pfam10016, pfam03583, pfam09922, pfam09952, pfam03934, pfam02604, pfam00970, pfam00732, pfam13955, pfam03640, pfam09822, pfam08076, pfam10625, pfam09619, pfam03526, pfam16350, pfam04717, pfam07824, pfam04829, pfam02894, pfam01203, pfam11773, pfam07362, pfam17080, pfam01891, pfam12255, pfam03865, pfam09579, pfam15781, pfam02691, pfam11614, pfam14098, pfam11007, pfam11112, pfam01408, pfam02917, pfam19192, pfam05975, pfam01297, pfam09791, pfam00499, pfam18088, pfam05638, pfam12142, pfam04705, pfam07876, pfam05425, pfam04134, pfam10646, pfam17643, pfam17561, pfam00269, pfam16962, pfam15526, pfam11612, pfam11393, pfam00664, pfam01058, pfam07660, pfam15645, pfam01558, pfam16732, pfam10439, pfam02592, pfam15534, pfam06769, pfam08050, pfam05134, pfam17000, pfam10684, pfam11459, pfam14449, pfam19417, pfam15644, pfam16073. More protein families may be fetched using the said Keyword list when a further larger number of strains are employed for unsupervised learning and validation.

Figure 5:
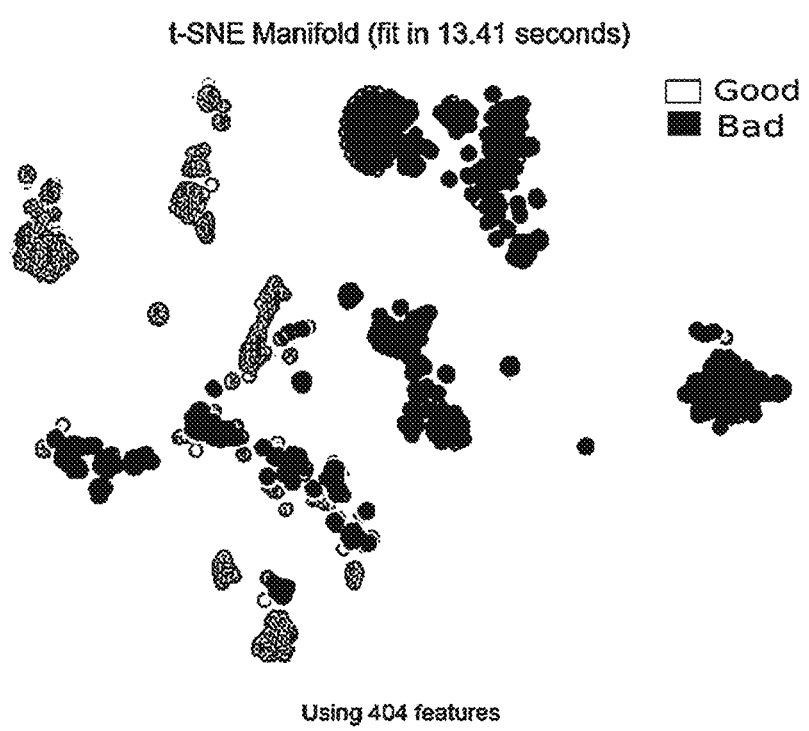
FIG. 5 shows a tSNE visualization of segregation of good and bad bacteria enabled by the protein families selected by competition linked target keyword combination according to some embodiments of the present disclosure.

FIG. 5 represents the tSNE results of the validation indicating a good segregation of good microbes from bad microbes when competition linked functional units were fetched in combination (total 404 protein families) using the Keyword List. Notably, the individual genomes (points) clustered very closely indicating a good scope for a decision boundary.

Figure 6:
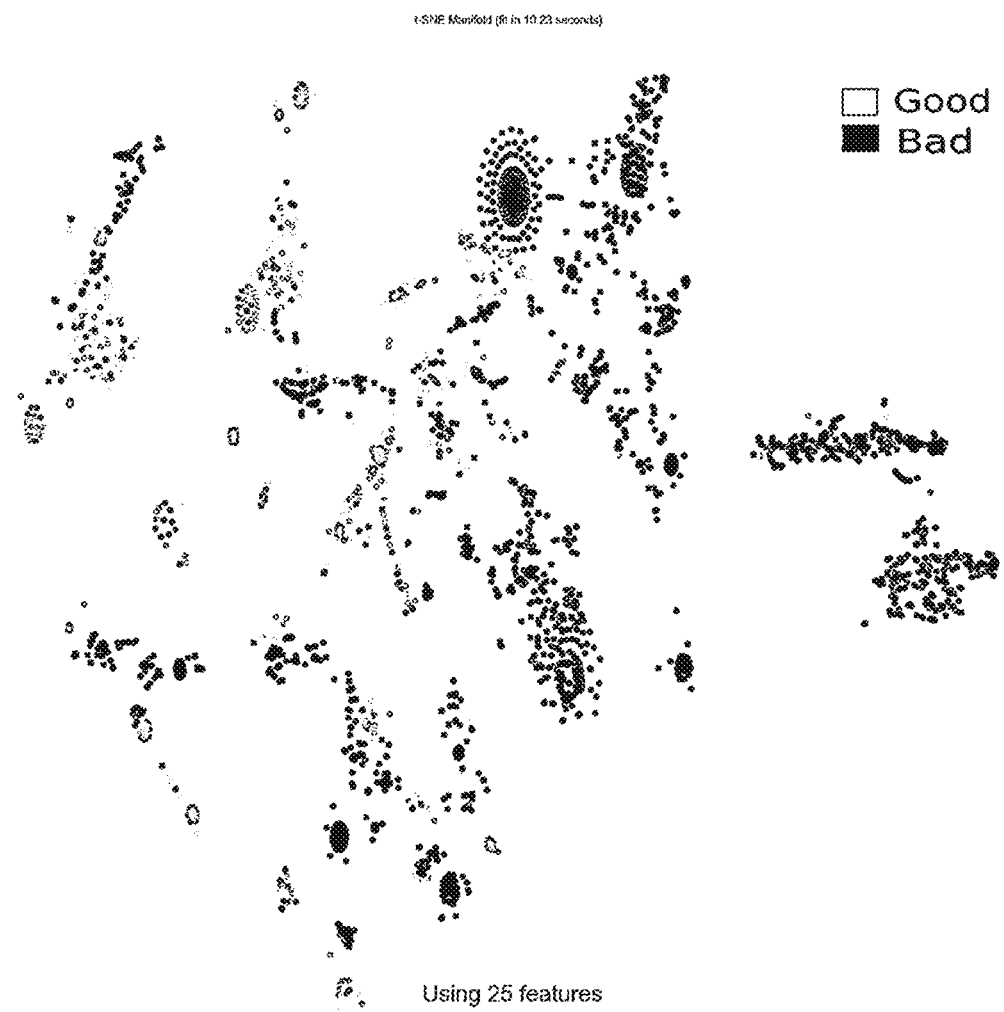
FIG. 6 shows a tSNE visualization of segregation of good and bad bacteria enabled by only ABC transporter linked functional units according to some embodiments of the present disclosure.

FIG. 6 represents the tSNE results of the validation indicating a poor segregation of good microbes from bad microbes when only ABC transport linked functional units (total 25 protein families) were employed. Notably, the individual genomes (points) didn't cluster very closely, in absence of a comprehensive coverage of competition linked functional units, indicated through a poor scope for a decision boundary.

Figure 7A:
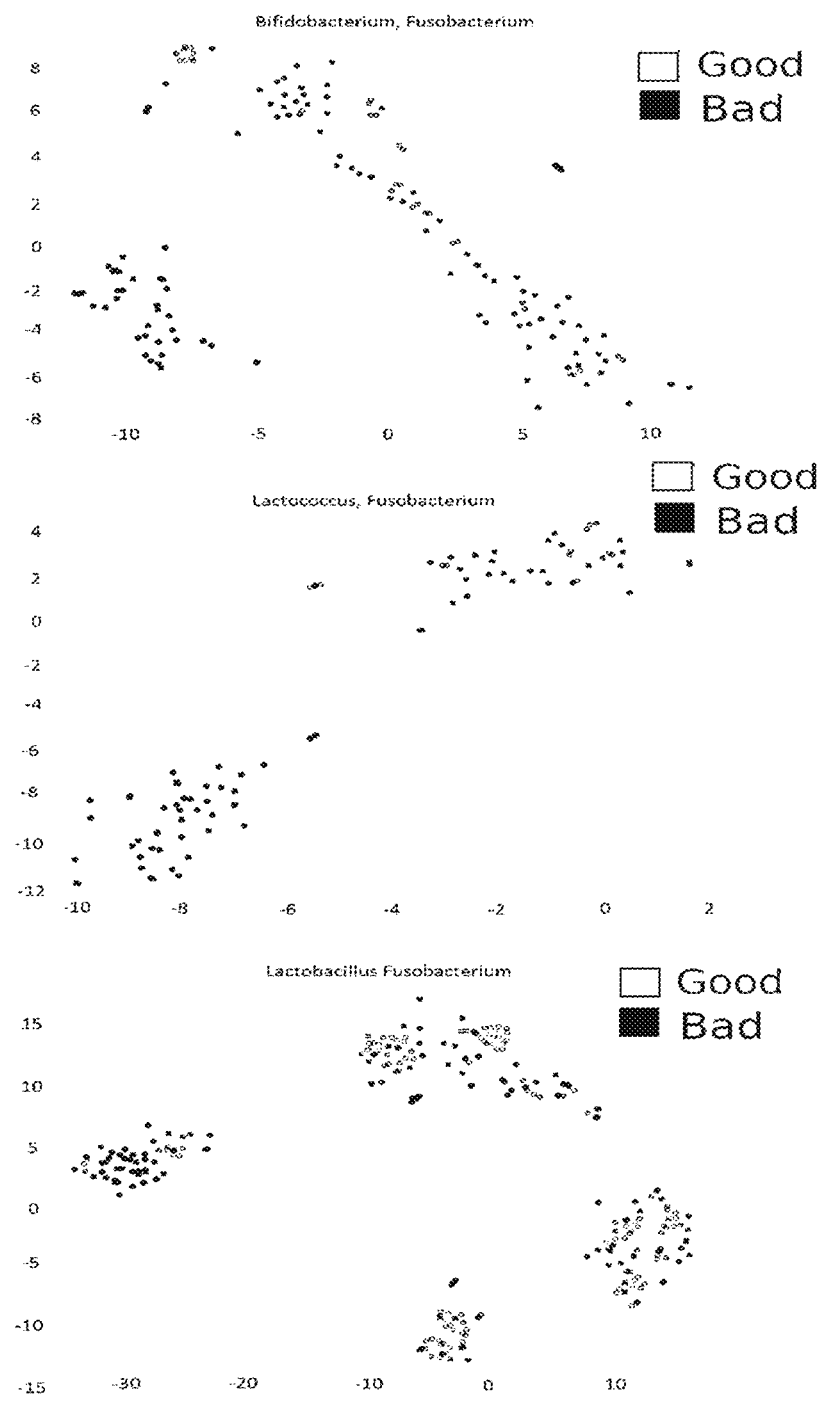
FIGS. 7A, 7B and 7C shows a tSNE visualization of segregation of good and bad bacteria in pairs of individual species or genera enabled by the protein families selected by competition linked target keyword combination according to some embodiments of the present disclosure.
Figure 7B:
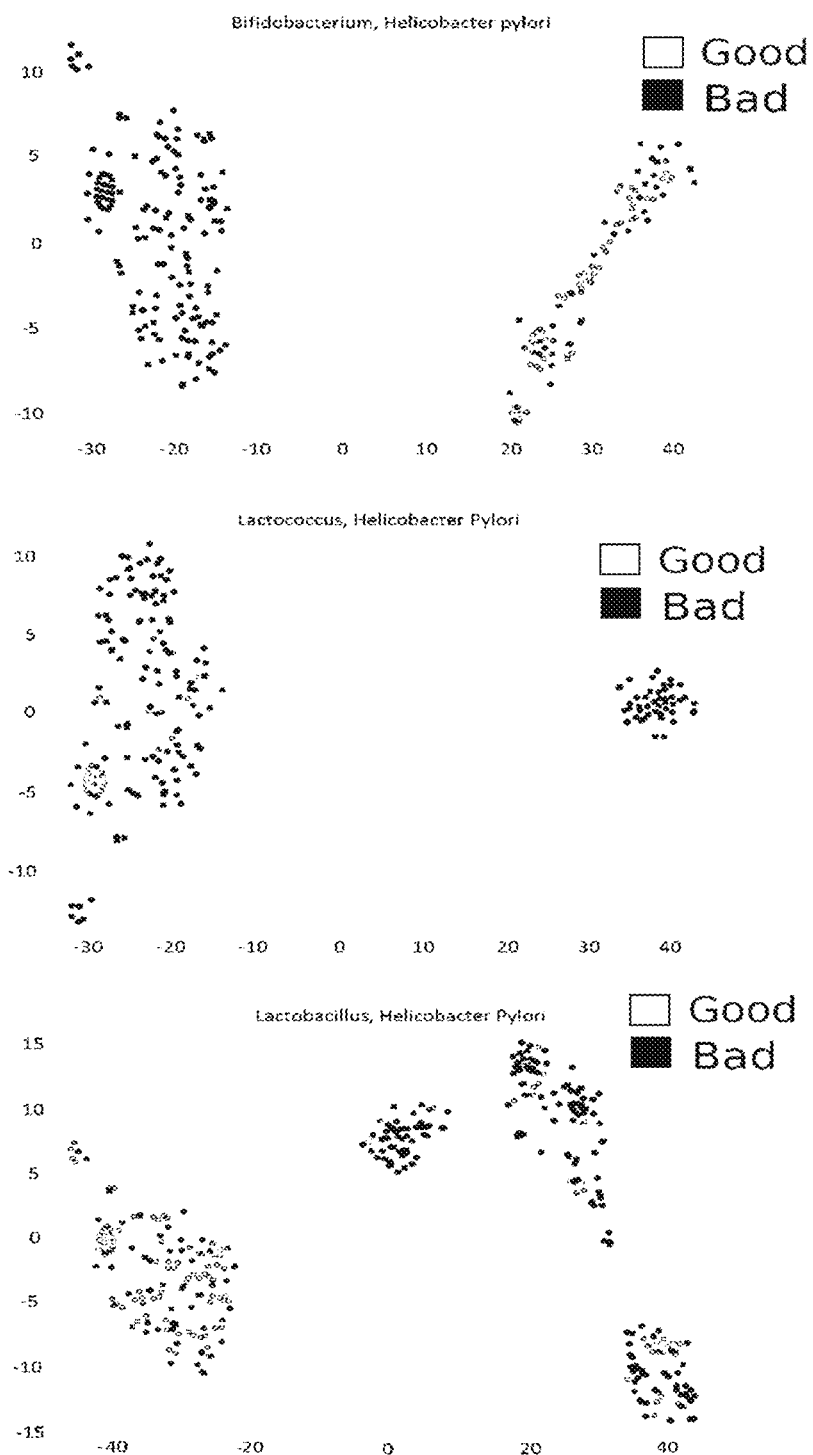
Figure 7C:
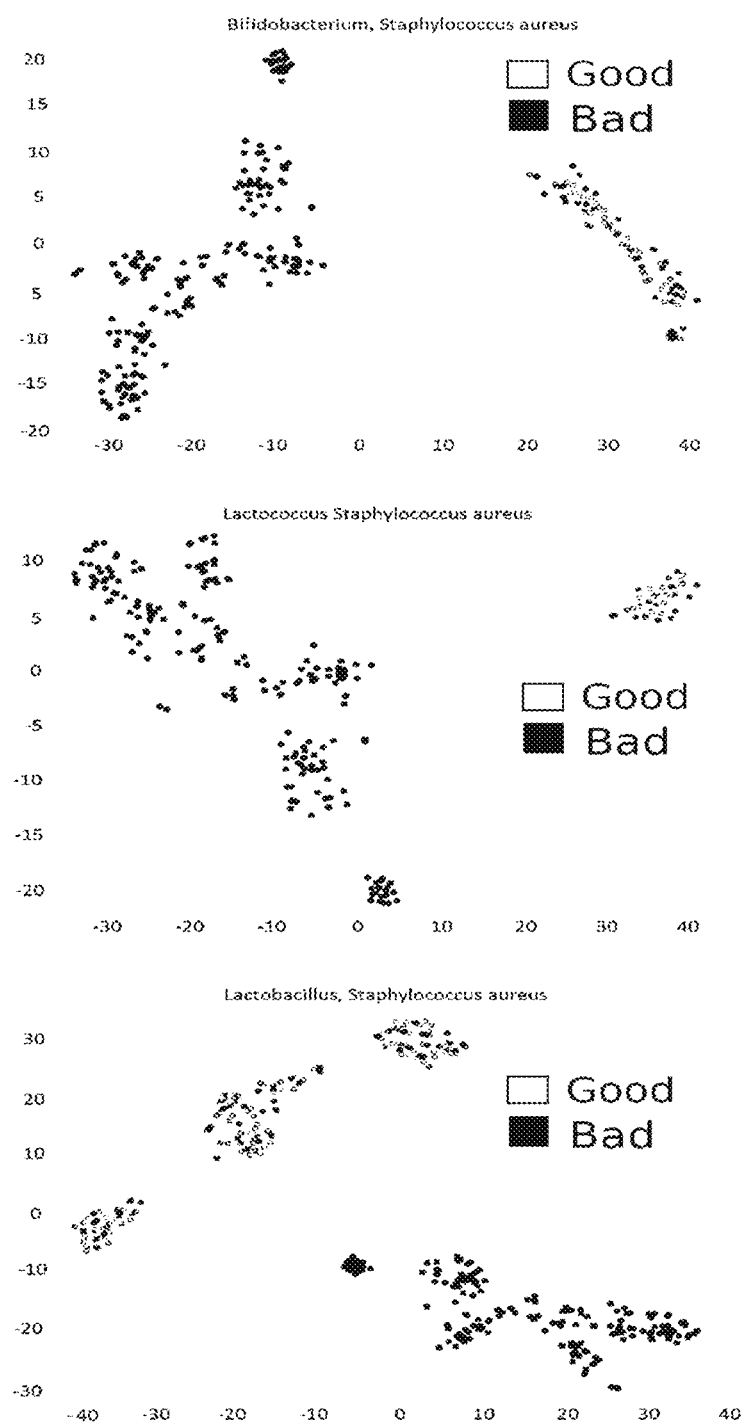

FIGS. 7A, 7B and 7C represents the tSNE results of the validation performed using the competition linked functional units fetched in combination using the Keyword list on all strains observed in different pairs of species or genera previously known to improve and promote cancer (i.e. in each pair one genus or species known to improve the health and other known to promote). The functions fetched through Keyword list indicated development of a good decision boundary. In each sub-plot of the figure, title of the charts represents name of good microbe specific species or genus followed by bad microbe specific species or genus.

An XGBoost decision tree (default parameters) based classification model was also developed. Supervised machine learning is performed on labelled microbes (i.e. good and bad microbes) whose functional annotation has been performed using keyword list. XGboost is an example classifier which is intended to specify in case study. The training data was created by using functions pertaining to the keyword list linked competitive trait functions for all strains of 'Bacteroides fragilis', 'Campylobacter jejuni', 'Cutibacterium acnes', 'Enterococcus hirae', 'Fusobacterium'; 'Helicobacter bilis', 'Helicobacter felis', 'Mycoplasma', 'Salmonella enterica', 'Streptococcus gallolyticus' as bad microbes and all strains of 'Bifidobacterium', 'Blautia', 'Butyrivibrio', 'Coprococcus', 'Faecalibacterium', 'Lactobacillus', 'Lactococcus', 'Pediococcus', 'Propionibacterium freudenreichii', 'Pseudoxanthomonas', 'Roseburia', 'Ruminococcus', 'Saccharopolyspora', 'Streptococcus salivarius', 'Streptococcus thermophilus' as good microbes. The held out test consisted of all strains of microbes pertaining to the 'Akkermansia muciniphila', 'Streptomyces', 'Methylobacter' as good microbes and 'Borrelia burgdorferi', 'Chlamydia pneumoniae', 'Helicobacter pylori', 'Staphylococcus aureus' as bad microbes (i.e. none of the strains pertaining to the held-out test were employed for training.

Figure 8A:
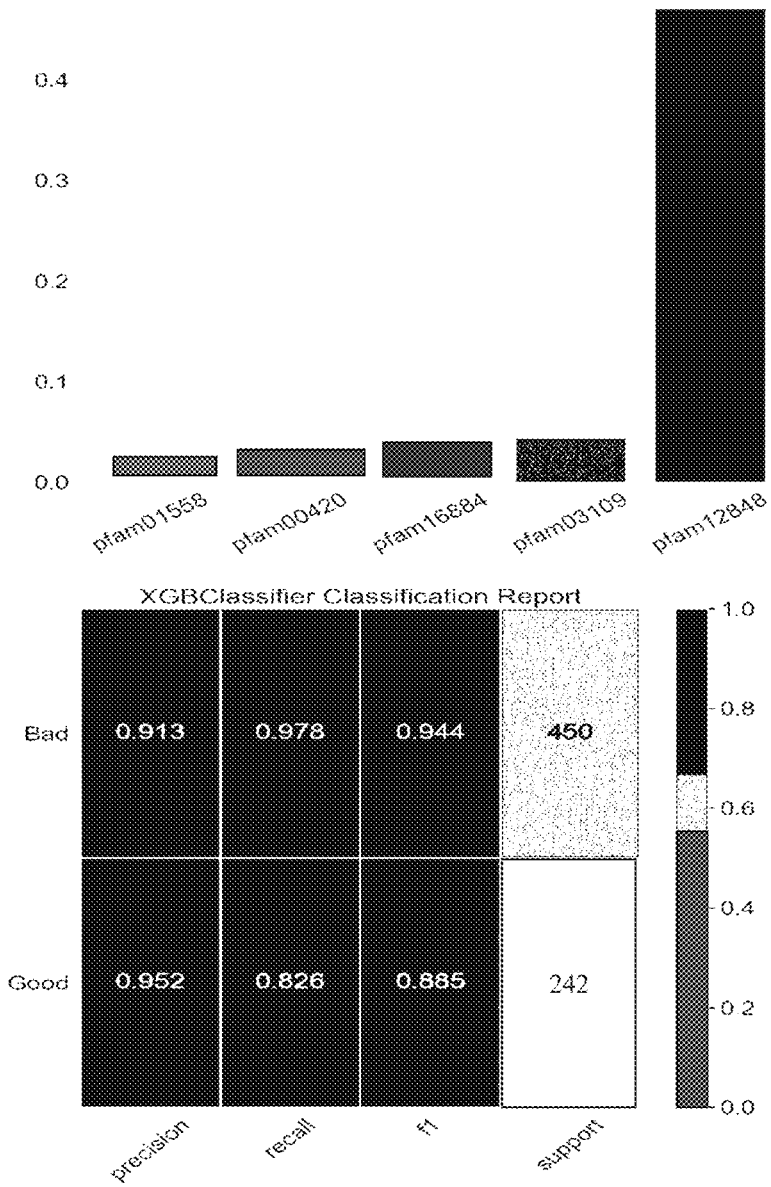
FIG. 8A-8B shows the performance of an XGboost based decision tree classifier based on the competition linked protein families in correctly predicting all bad and good bacterial strains of bacterial genera which were not employed for training the model according to some embodiments of the present disclosure.
Figure 8B:
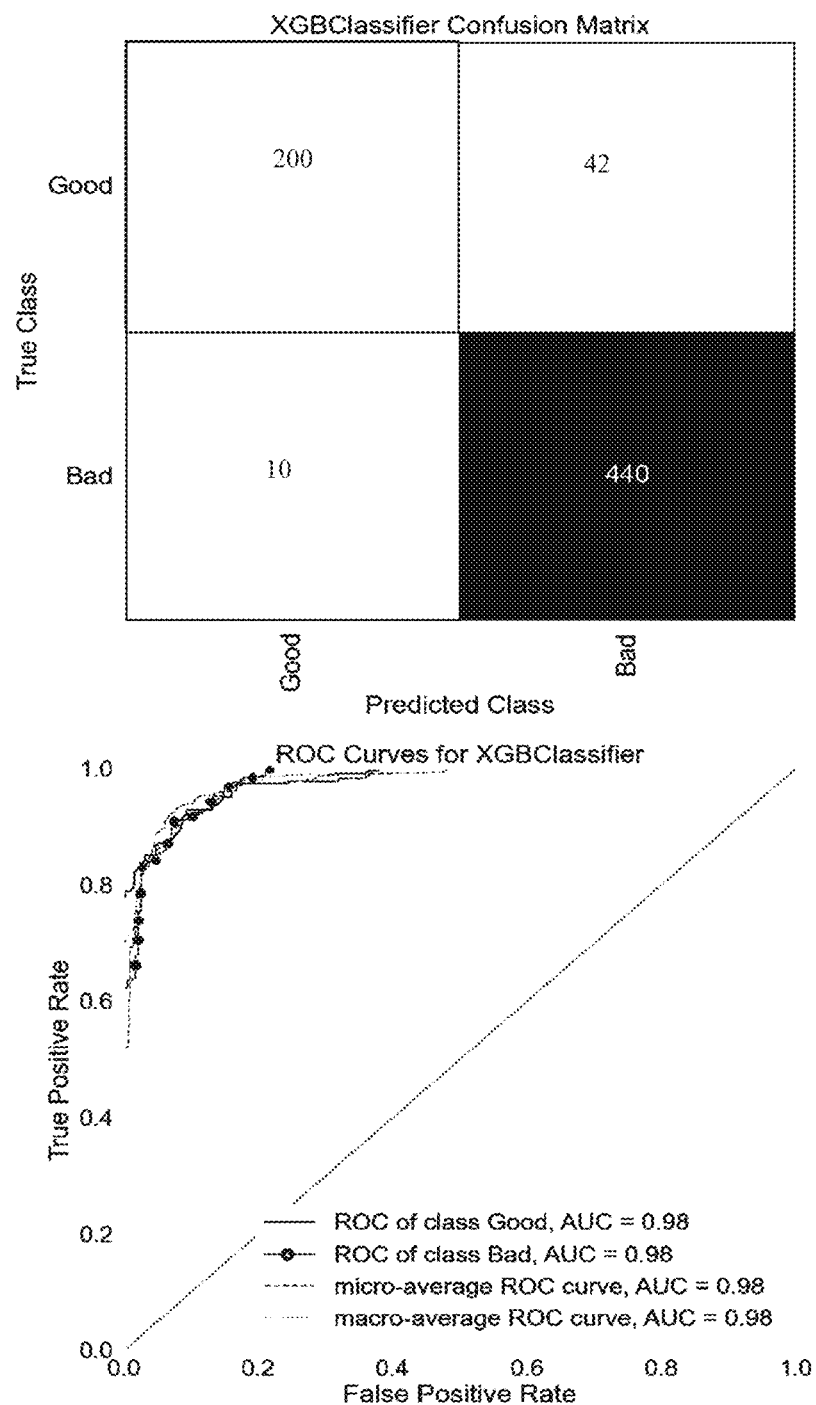

FIGS. 8A and 8B represents the performance report of the model indicating a good predictive power with an AUC ROC of 0.98 and a high recall (0.97) for bad microbes. Top 5 protein families contributing to the model accuracy were Pfam 12848 (ABC transporter), Pfam 03109 (ABC1 atypical kinase-like domain), Pfam 16884 (N-terminal domain of oxidoreductase), Pfam 00420 (NADH-ubiquinone/plastoquinone oxidoreductase chain 4 L) and Pfam 01558 (Pyruvate ferredoxin/flavodoxin oxidoreductase) indicating a high relevance on ability to survive or compete through transport functions and functions to manage oxidative stresses.

Figure 9A:
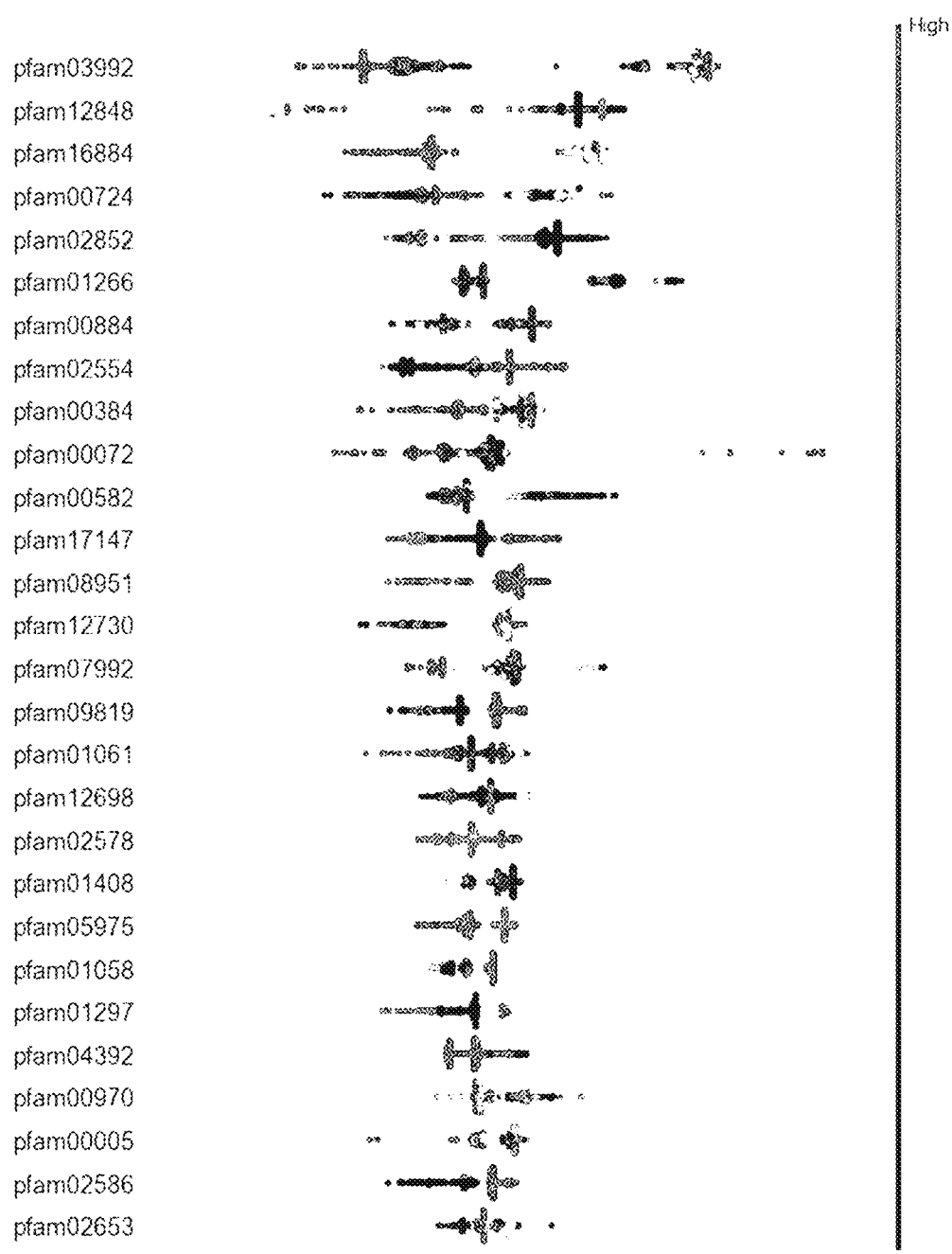
FIGS. 9A, 9B and 9C shows the shapley values of the individual protein families driving the decision of the classifier of Fig New 2 according to some embodiments of the present disclosure.
Figure 9B:
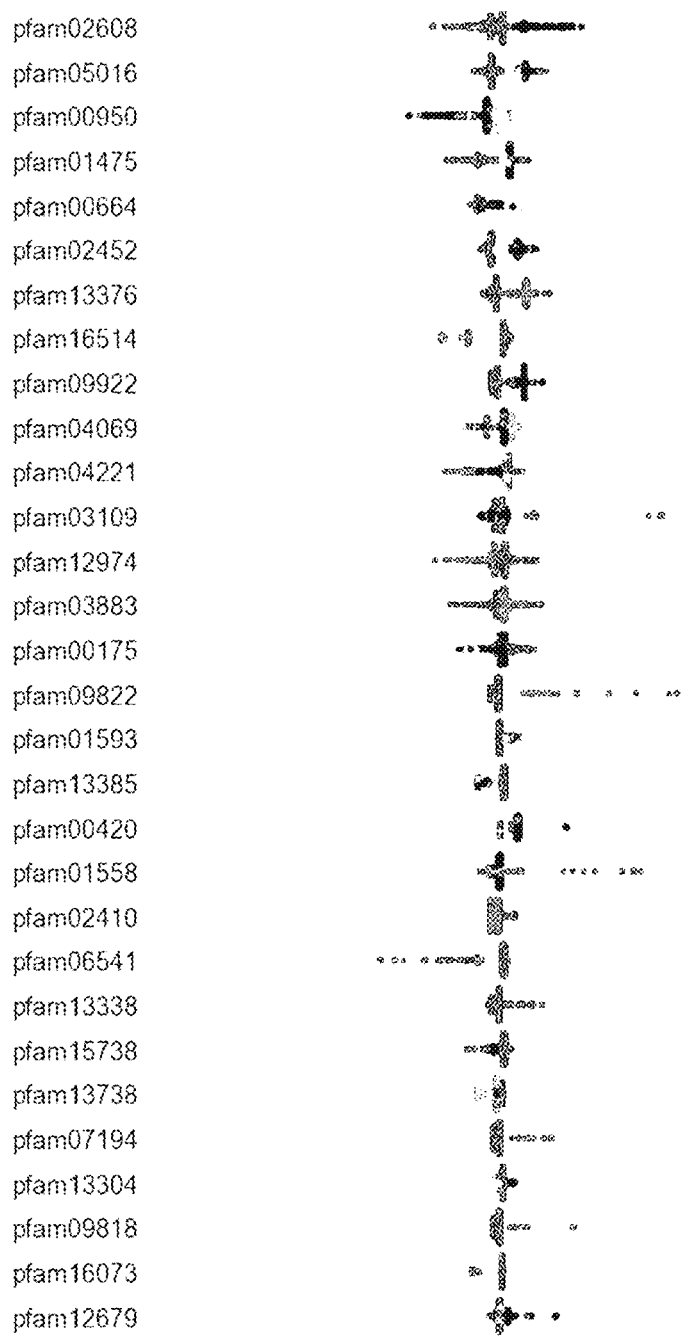
Figure 9C:
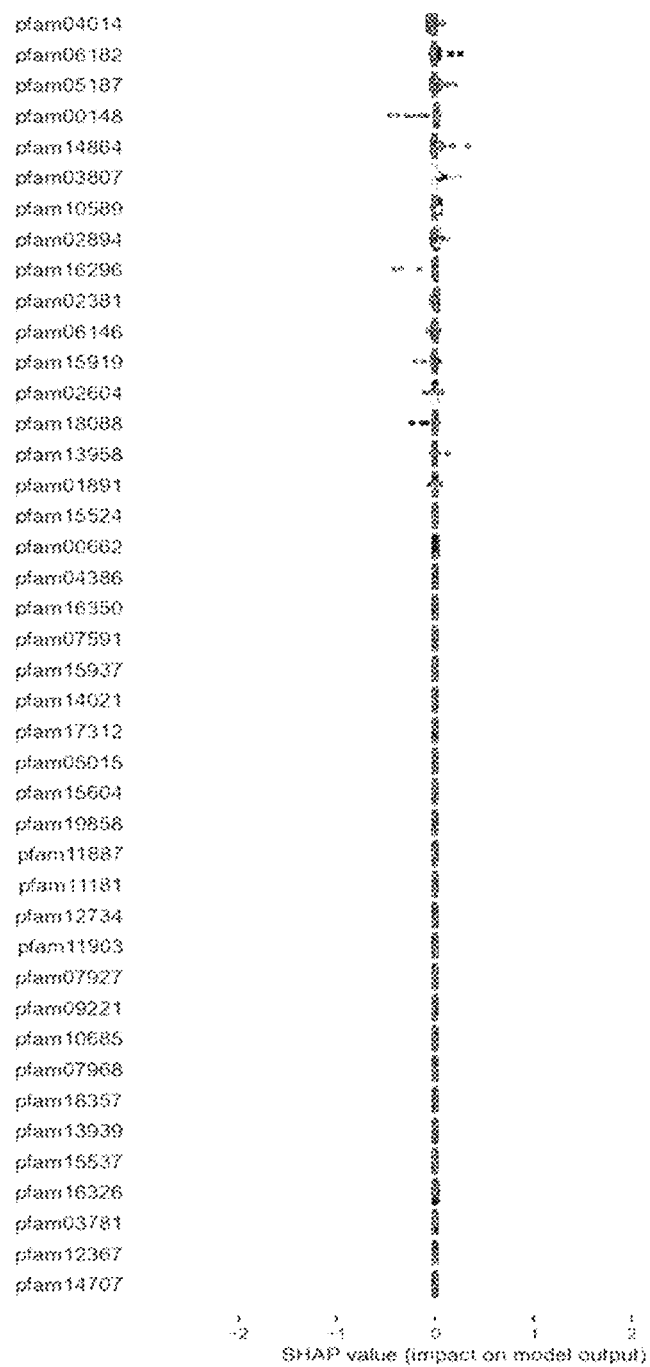
Figure 10:
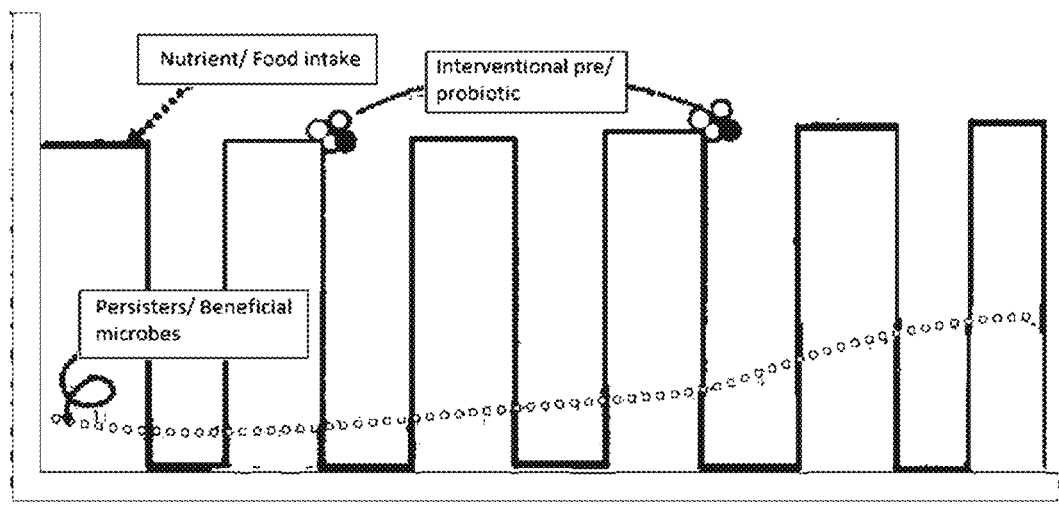
FIG. 10 shows a schematic representation of intervention timeline between fasting events according to some embodiments of the present disclosure.

In order to understand the decision contributions of individual protein families, a post-hoc interpretation of the model was attempted using Shapley additive explanations yielding three combinations of protein families by inspection of FIGS. 9A, 9B and 9C in such a way that all such protein families were ignored whose contributions (Shapley values) were less than 0.01 in more than 90% of the genomes (microbial strains). The protein families whose presence lead to high Shapley value (bad microbe prediction) were used for creating Combination 1 while the protein families whose presence lead to negative shapley value were employed for creating combination 2. The protein families with mixed contributions (i.e presence or absence contributing to both positive and negative shapley value) were used to create combination 3.

Combination 1—Combination of important functional units in terms of protein families (Pfam) identified using the machine learning, performed on microbial knowledgebase created using the keywords combination (in Keyword list) mapped functions, for predicting the bad bacteria

| | |
|---|---|
| pfam12848 | ABC transporter |
| pfam06257 | Biofilm formation stimulator VEG |
| pfam15432 | Accessory Sec secretory system ASP3 |
| pfam01566 | Natural resistance-associated macrophage protein |
| pfam00269 | Small, acid-soluble spore proteins, alpha/beta type |
| pfam00970 | Oxidoreductase FAD-binding domain |
| pfam02452 | PemK-like, MazF-like toxin of type II toxin-antitoxin system |
| pfam13376 | Bacteriocin-protection, YdeI or OmpD-Associated |
| pfam03848 | Tellurite resistance protein TehB |
| pfam17965 | Mucin binding domain |
| pfam03883 | Peroxide stress protein YaaA |
| pfam07194 | P2 response regulator binding domain |
| pfam09547 | Stage IV sporulation protein A (spore_IV_A) |

Combination 2—Combination of important functional units in terms of protein families (Pfam) identified using the machine learning, performed on microbial knowledgebase created using the keywords combination (in Keyword list) mapped functions, for predicting the good bacteria

| | |
|---|---|
| pfam17147 | Pyruvate:ferredoxin oxidoreductase core domain II |
| pfam08951 | Enterocin A Immunity |
| pfam02578 | Multi-copper polyphenol oxidoreductase laccase |
| pfam12730 | ABC-2 family transporter protein |
| pfam01297 | Zinc-uptake complex component A periplasmic |
| pfam15738 | Bacterial toxin of type II toxin-antitoxin system, YafQ |
| pfam09819 | ABC-type cobalt transport system, permease component |
| pfam12974 | ABC transporter, phosphonate, periplasmic substrate-binding protein |
| pfam02534 | Type IV secretory system Conjugative DNA transfer |
| pfam02554 | Carbon starvation protein CstA |
| pfam02410 | Ribosomal silencing factor during starvation |

Combination 3—Combination of important functional units in terms of protein families (Pfam) identified using the machine learning, performed on microbial knowledgebase created using the keywords combination (in Keyword list) mapped functions, observed to have mixed decision contribution for both good and bad bacteria prediction

| | |
|---|---|
| pfam02852 | Pyridine nucleotide-disulphide oxidoreductase, dimerisation domain |
| pfam16884 | N-terminal domain of oxidoreductase |
| pfam00582 | Universal stress protein family |
| pfam13437 | HlyD family secretion protein |
| pfam00384 | Molybdopterin oxidoreductase |
| pfam01266 | FAD dependent oxidoreductase |
| pfam00188 | Cysteine-rich secretory protein family |
| pfam01061 | ABC-2 type transporter |
| pfam05425 | Copper resistance protein D |
| pfam01408 | Oxidoreductase family, NAD-binding Rossmann fold |
| pfam15738 | Bacterial toxin of type II toxin-antitoxin system, YafQ |
| pfam07992 | Pyridine nucleotide-disulphide oxidoreductase |
| pfam12698 | ABC-2 family transporter protein |
| pfam02653 | Branched-chain amino acid transport system/permease component |
| pfam13385 | Concanavalin A-like lectin/glucanases superfamily |
| pfam00662 | NADH-Ubiquinone oxidoreductase (complex I), chain 5 N-terminus |
| pfam00950 | ABC 3 transport family |
| pfam06640 | P protein C-terminus |
| pfam00903 | Glyoxalase/Bleomycin resistance protein/Dioxygenase superfamily |
| pfam02537 | CrcB-like protein, Camphor Resistance (CrcB) |
| pfam02894 | Oxidoreductase family, C-terminal alpha/beta domain |
| pfam02537 | CrcB-like protein, Camphor Resistance (CrcB) |
| pfam02894 | Oxidoreductase family, C-terminal alpha/beta domain |

More combinations and protein families pertaining to competitive traits in microbes are well within the scope of the invention, especially when larger labelled datasets are incorporated (i.e. larger information on the microbes which are observed to improve state of health or promote cancer).

FIG. 10 to FIG. 17 show the differential status and further solutions derived based on the following analysis: Assessing the anti-cancer responses like bacteriocin synthesis functional units, arginine and asparagine depletion function (cancer cells are auxotrophic, hyper anabolic and are less resilient to stresses), uptake of Branched chain amino acids and other amino acids by bacteria in calorie restricted (CR) and non-calorie restricted (AL) samples, thereby stressing the cancer cells. Next generation sequencing data pertaining to this study is available at NCBI against BioProject ID: PRJEB20796. There was an apparent high abundance of functional units corresponding to amino acid uptake/transport, bacteriocin biosynthesis, arginine deiminase and asparaginase-2 in samples pertaining to calorie restricted state, as compared to the AL samples.

Figure 11:
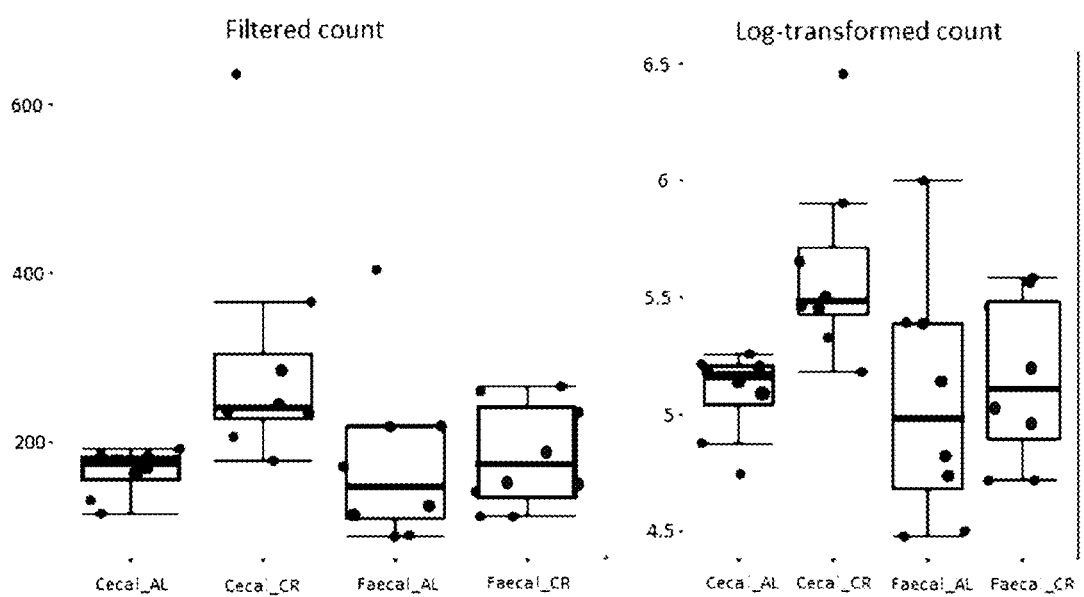
FIG. 11 shows a box plot representation of the abundance of Branched-chain amino acid transport, permease (IPR011606) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 11 shows a box plot representation of the abundance of Branched-chain amino acid transport, AzIC or IPR011606 in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 12:
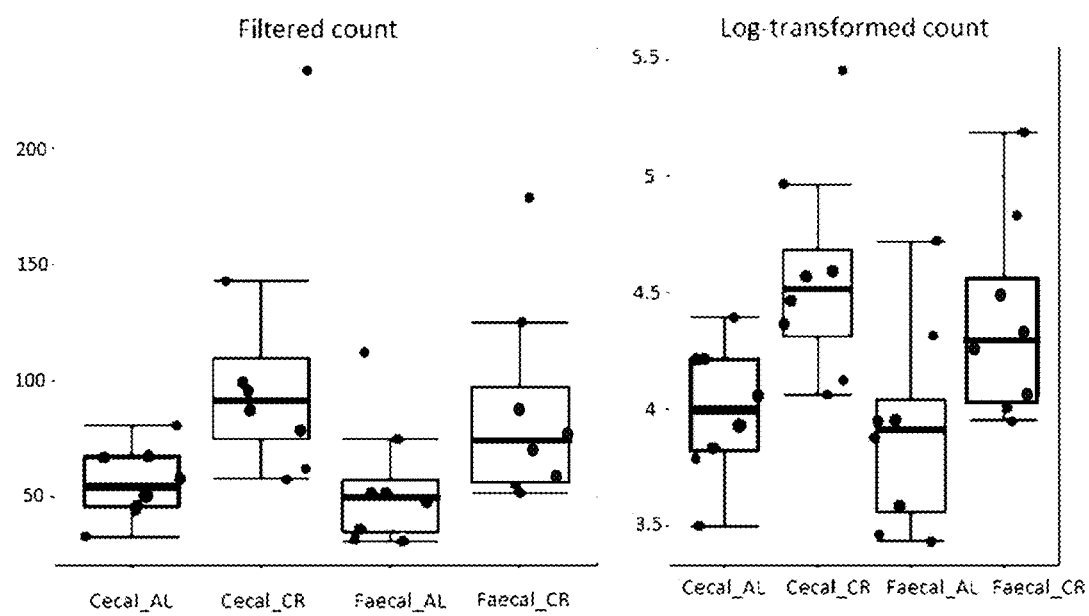
FIG. 12 shows a box plot representation of the abundance of Branched-chain amino acid transport system II carrier protein (IPR004685) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 12 shows a box plot representation of the abundance of Branched-chain amino acid transport system II carrier protein (IPR004685) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 13:
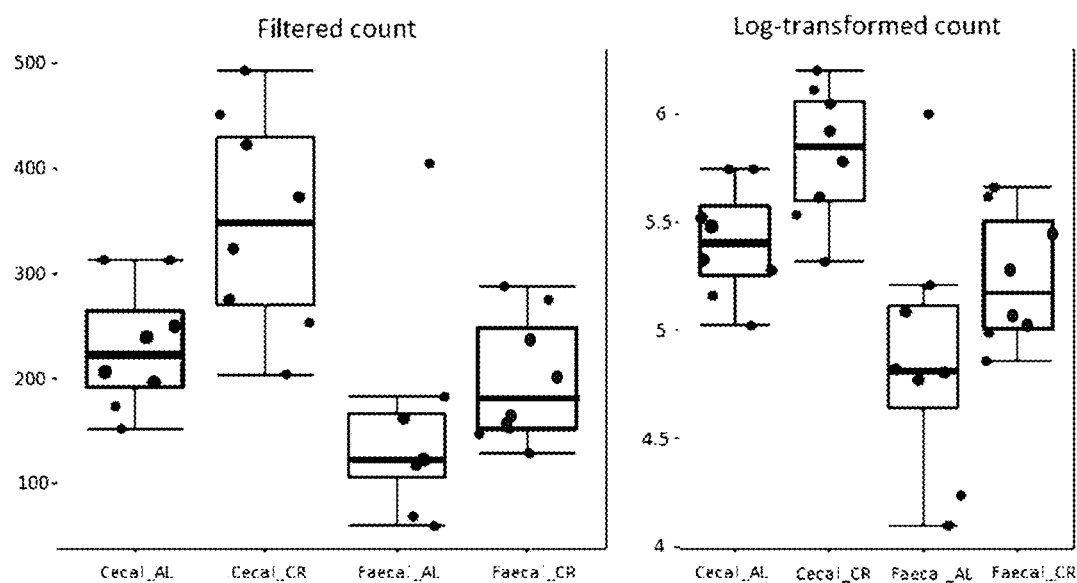
FIG. 13 shows a box plot representation of the abundance of Amino acid ABC transporter, permease protein, 3-TM domain (IPR010065) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 13 shows a box plot representation of the abundance of Amino acid ABC transporter, permease protein, 3-TM domain (IPR010065) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 14:
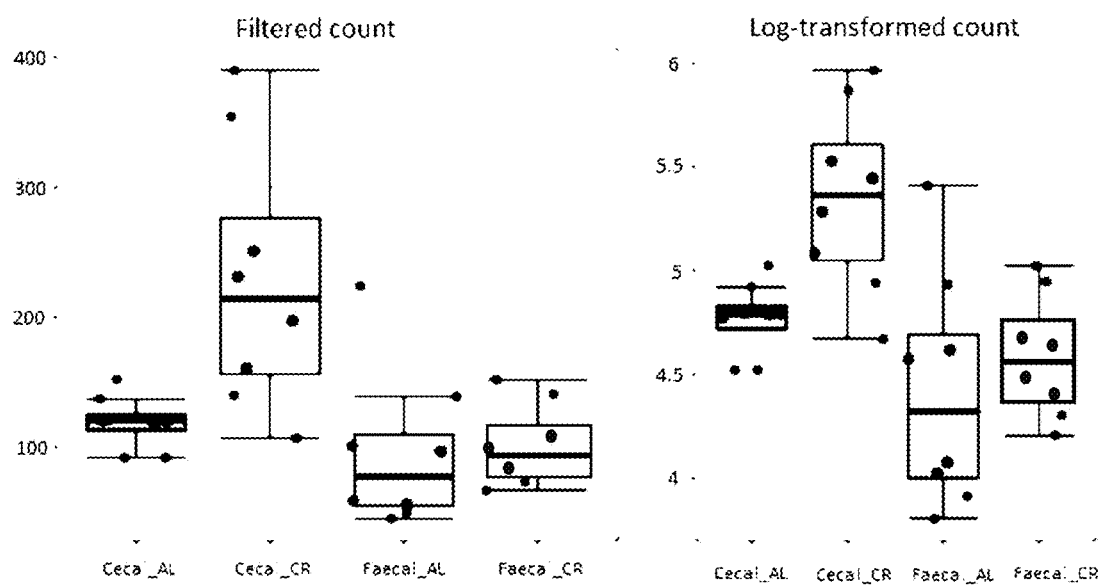
FIG. 14 shows a box plot representation of the abundance of Branched-chain amino acid ATP-binding cassette transporter, C-terminal (IPR032823) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 14 shows a box plot representation of the abundance of Branched-chain amino acid ATP-binding cassette transporter, C-terminal (IPR032823) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 15:
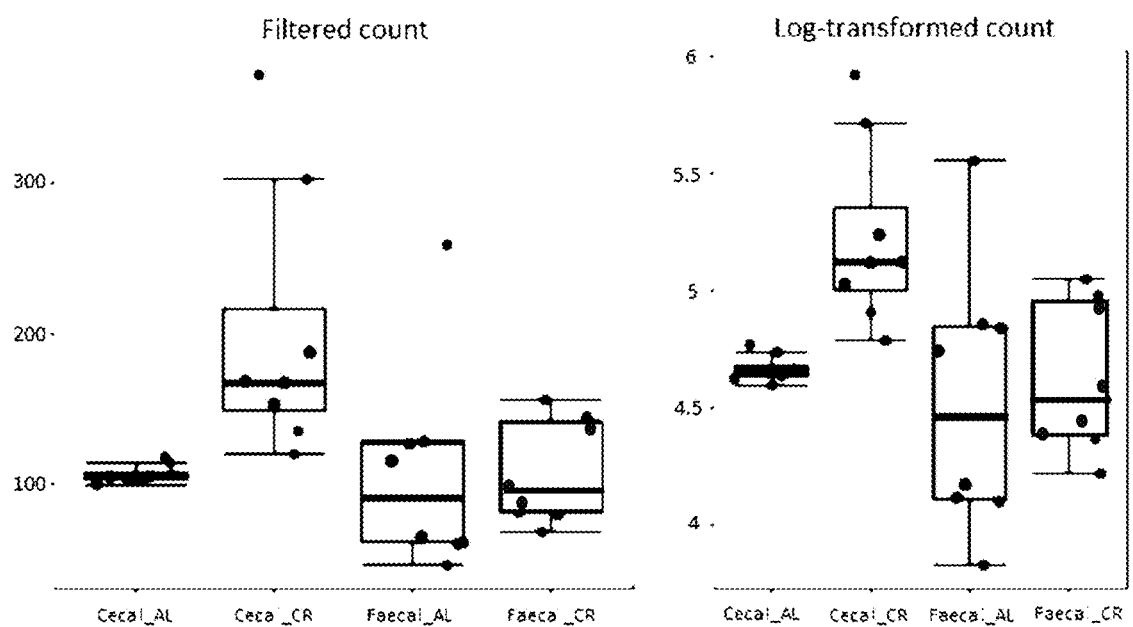
FIG. 15 shows a box plot representation of the abundance of Branched-chain amino acid transport, AzlD (IPR008407) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 15 shows a box plot representation of the abundance of Branched-chain amino acid transport, AzID (IPR00840) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 16:
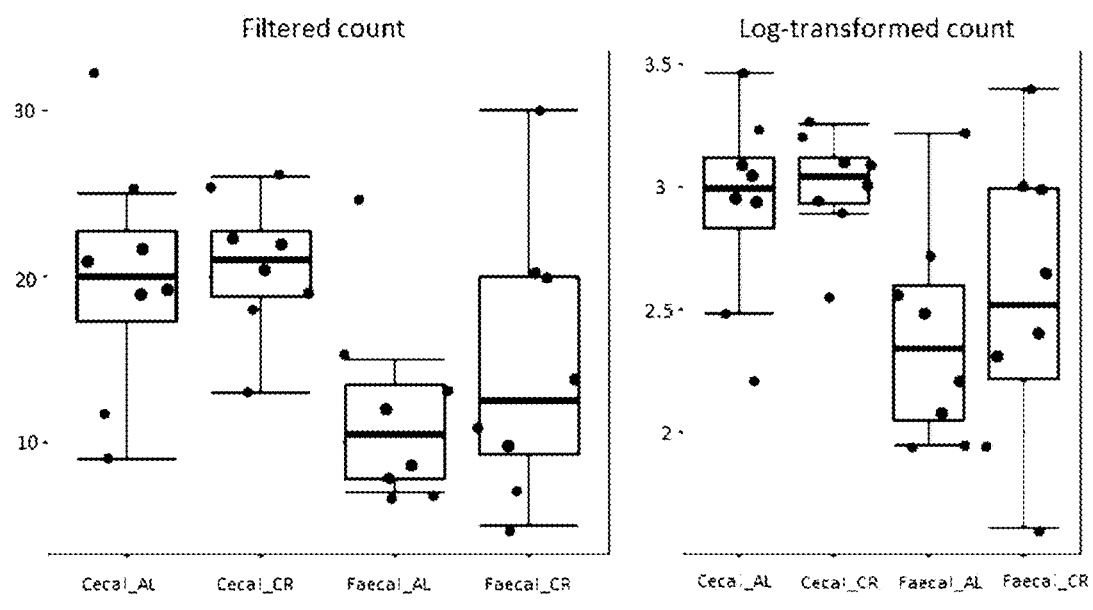
FIG. 16 shows a box plot representation of the abundance of Thiopeptide-type bacteriocin biosynthesis domain (IPR023809) in Faecal non-calorie restricted samples (Faecal_AL), Caecal non-calorie restricted samples (Caecal_AL), Faecal calorie restricted samples (Faecal_CR), and Caecal calorie restricted samples (Caecal_CR) according to some embodiments of the present disclosure.

FIG. 16 shows a box plot representation of the abundance of Thiopeptide-type bacteriocin biosynthesis domain (IPR023809) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

Figure 17:
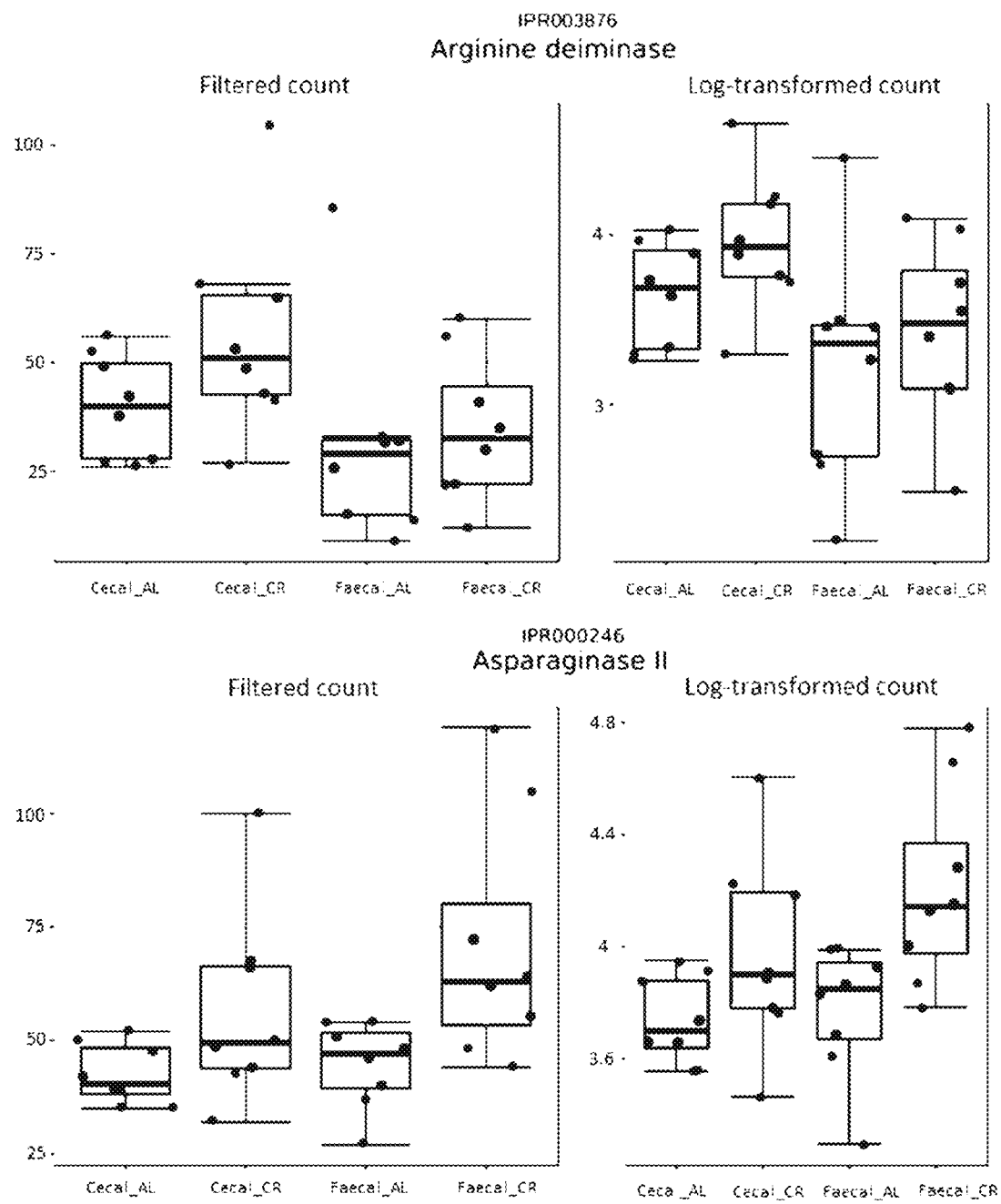
FIG. 17 shows a box plot representation of the abundance of Arginine deiminase (IPR003876) and asparaginase-2 (IPR000246) in Faecal non-calorie restricted samples (Faecal_AL), Caecal non-calorie restricted samples (Caecal_AL), faecal calorie restricted samples (Faecal_CR), and Caecal calorie restricted samples (Caecal_CR) according to some embodiments of the present disclosure.

FIG. 17 shows a box plot representation of the abundance of Arginine deiminase and Aspraginase II (IPR03876) in Faecal non-calorie restricted samples (Faecal_AL), Caecal non-calorie restricted samples (Caecal_AL), Faecal calorie restricted samples (Faecal_CR), Caecal calorie restricted samples (Caecal_CR) according to an embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosure herein addresses unresolved problem related to early and effective prediction of risk of cancer in a person. The embodiment thus provides the method and system for preparing a knowledgebase of microbes and microbial function to reduce the risk of cancer in the person It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for preparing a knowledgebase of microbes and microbial function to reduce the risk of cancer in a person, the method comprising:
providing one or more microbial strains as a probiotic to a cancer host and a non-cancer host;
labelling, via one or more hardware processors, the one or more microbial strains into one of a good strain or a bad strain based on an impact on health of the cancer host and the non-cancer host;
performing, via a sequencer, a whole gene sequencing on the labelled good strain and the bad strains;
performing, via the one or more hardware processors, functional annotations on sequenced good strain and the bad strain to get a good and bad microbes' functional database;
filtering, via the one or more hardware processors, the good and bad microbes' functional database using a combination of a plurality of keywords in their names and the combination of the plurality of keywords are expected to pertain to microbial competition traits and have implications directly or indirectly in inhibiting or promoting cancer progression in collateral to competitive nature of microbes, wherein the filtering results in generation of a labelled knowledgebase of good and bad microbes with competition linked functional units;
performing, via the one or more hardware processors, genome clustering on the labelled knowledgebase of good and bad microbes using an unsupervised learning technique and validating if good and bad microbes are segregated on the basis of the competition linked functional units;
generating, via the one or more hardware processors, using a supervised machine learning technique:
a good microbe prediction model,
a bad microbe prediction model, and
functional units promoting competition against cancer;
learning, via the one or more hardware processors, a context whether a feature drives good microbe prediction or bad microbe prediction using Shapley additive explanations;

creating, via the one or more hardware processors, the knowledgebase of microbes and microbial function from the labelled knowledgebase of good and bad microbes containing only good prediction driving functional units;

receiving an unknown microbe;

identifying, via the one or more hardware processors, a nature of the unknown microbe using the context;

storing, via the one or more hardware processors, the knowledgebase of microbes and microbial function with the good microbes based on the identified nature;

creating a digital twin of a host-microbe-cancer crosstalk or interaction using the knowledgebase;

designing, via the one or more hardware processors, a cocktail of microbes, microbial molecules and microbe modulating molecules using the knowledgebase of microbes and microbial function to be given to the person at risk for use over an intermittent fasting regimen, immediately before and after a fasting period, wherein the cocktail is configured to avoid initiation, progression and side effects of cancer; and administering the cocktail specific to a design meant for a specific type of cancer, wherein the administering of the cocktail is performed repeatedly for each intermittent fasting event that follows until one or more of the microbes have sustained in the host to yield a higher abundance in the fasting event as compared to a non-fasting event across multiple time points post cessation of the cocktail administration, wherein the cocktail is administered in at least one of the form as a topical ointment to be applied on exposed surfaces vulnerable to cancer or affected by cancer, paste or liquid or gel or powder or a spray or a roller form of application involving delivery of a layer on top of an affected site, an injection or probiotic and prebiotic supplements, wherein the processor implemented method is implemented for diagnosis or treatment of cancer without intervening an ongoing diagnosis or treatment.

2. A processor implemented method of claim 1 further comprising assessing and reducing the risk of cancer in the person using the knowledgebase of microbes and microbial functions, the method comprising:

obtaining three or more samples from a body site of the person before the fasting event;

obtaining three or more samples from a body site of the person after the fasting event;

extracting, via a DNA extractor, one of microbial DNA, RNA, protein or metabolites from the obtained samples;

sequencing, via a sequencer, the extracted DNA to get sequenced metagenomic reads;

creating, via one or more hardware processors, a biological feature abundance profile using the sequenced metagenomic reads, wherein the biological feature abundance profile refers to a number of times a biological feature specific one of microbial DNA, RNA, protein or metabolites is observed during sequencing;

providing, via the one or more hardware processors, the knowledgebase of microbes and microbial function;

calculating, via the one or more hardware processors, a ratio of abundance of microbes specific to the cancer using the knowledgebase across consecutive time points and median of time points corresponding to after the fasting event and before the fasting event;

plotting, via the one or more hardware processors, a scatter plot, among the microbes identified during sequencing in the collected sample, of the ratio of abundance of microbes specific to cancer;

identifying, via the one or more hardware processors, the person at risk if the slope of the scatter plot is negative.

3. The processor implemented method of claim 2, wherein the samples refer to one of stool sample, tissue samples from body sites, a swab, and saliva.

4. The processor implemented method of claim 2, wherein the cocktail design is decided by three factors: (I) a type of cancer, (II) a type of functional units whose abundance ratio plot is indicating risk, and (III) microbes whose scatter plot is indicating risk.

5. The processor implemented method of claim 2, wherein the biological feature corresponds to a microbe, a protein, a peptide, or a metabolite.

6. The processor implemented method of claim 2, further comprising designing self-sustaining compositions aiming to administer microbes that can accelerate production of organic acids in the host, stabilize inside the host, and sustain an unsupported priming of general stress response in the other constituting microbes of the cocktail.

7. The processor implemented method of claim 1, wherein the plurality of keywords comprises 'ABC', 'ocin', 'self-protect', 'polyphen', 'glucanase', 'sulfatase', 'stress', 'response', 'uptake', 'starvation', 'Branched-chain amino acid transport system', 'oxidoreductase', 'Antibiotic biosynthesis', 'glycoside hydrolase', 'toxin', 'biofilm', 'Mucin binding', 'spore', 'resist', and 'secret'.

8. The processor implemented method of claim 1, further comprising designing supported compositions aiming at accelerated priming of general stress response in microbes of administered cocktail as well as microbes inside the host and inside the host's tumor or cancer.

9. The processor implemented method of claim 1, further comprising creating a second knowledgebase of microbes and microbial functions using labelled and unlabeled genomes, the method comprising:

collecting a plurality of genomes of all known microorganisms at a strain level;

obtaining annotations for each of the plurality of genomes;

identifying a plurality of functional units that are implicated in microbial competition sensing and have implications directly or indirectly in inhibiting cancer progression;

creating a primary matrix where a first column represents microbes whose genomes are fully or partially sequenced and a first row represents the functional units, wherein the cells of the primary matrix represent values corresponding to abundance of the functional units in the genomes of a plurality of microbes;

creating a secondary matrix where a first column of the secondary matrix comprises names of the functional units and a first row comprises a meta-information for the functional units, wherein the meta-information for the functional units include a type of functional unit, regulatory or non-regulatory nature of the functional unit and the type of cancer each functional unit is associated with and values corresponding to pathogenicity, gram nature, human inhabitability, the type of cancer, the regulatory or non-regulatory nature, the type of functional unit are one-hot-encoded to enable compatibility of their information embedding with quantitative counts or abundance of functional unit information in the secondary matrix, wherein the type of cancer and the type of functional unit requires multi label binarizer to obtain a different binary classification for each functional unit for each type of cancer and each type of functional unit;

creating a tertiary matrix for the microbes in the primary matrix with a logical qualification;

creating clusters of microbes using the tertiary matrix using clustering methods, wherein the clustering methods include hierarchical clustering, topic modeling, mixture models, using the abundance values;

performing a nature based categorization of the microbes, wherein the nature refers to type of functional units, the type of cancer and the microbes available in the primary matrix and the secondary matrix;

developing a machine learning classifier using a known anti-cancer potential of the microbes in the primary matrix and their function unit value data from the primary matrix, wherein the machine learning classifier segregates the microbes between anti-cancer and non anti-cancer class based on the functional unit data in the primary matrix, wherein the microbes classified as the anti-cancer microbes are sorted according to the meta-information; and storing the clusters, groups and sorted list of the microbes as the second knowledge base as an SQL database.

10. A system for preparing a knowledgebase of microbes and microbial function to reduce the risk of cancer in a person, the system comprises:

a sample collection module for providing one or more microbial strains as a probiotic to a cancer host and a non-cancer host;

one or more hardware processors;

a memory in communication with the one or more hardware processors, wherein the one or more first hardware processors are configured to execute programmed instructions stored in the memory, to:

label the one or more microbial strains into one of a good strain or a bad strain based on an impact on health of the cancer host and the non-cancer host;

perform, via a sequencer, a whole gene sequencing on the labelled good strain and the bad strains;

perform functional annotations on sequenced good strain and the bad strain to get a good and bad microbes' functional database;

filter the good and bad microbes' functional database using a combination of a plurality of keywords in their names and the combination of the plurality of keywords are expected to pertain to microbial competition traits and have implications directly or indirectly in inhibiting or promoting cancer progression in collateral to competitive nature of microbes, wherein the plurality of keywords comprises 'ABC', 'ocin', 'self-protect', 'polyphen', 'glucanase', 'sulfatase', 'stress', 'response', 'uptake', 'starvation', 'Branched-chain amino acid transport system', 'oxidoreductase', 'Antibiotic biosynthesis', 'glycoside hydrolase', 'toxin', 'biofilm', 'Mucin binding', 'spore', 'resist', and 'secret', wherein the filtering results in generation of a labelled knowledgebase of good and bad microbes with competition linked functional units;

perform genome clustering on the labelled knowledgebase of good and bad microbes using an unsupervised learning technique and validate if good and bad microbes are segregated on the basis of the competition linked functional units;

generate using a supervised machine learning technique:

a good microbe prediction model,
a bad microbe prediction model, and
functional units promoting competition against cancer;

learn a context whether a feature drives good microbe prediction or bad microbe prediction using Shapley additive explanations;

creating the knowledgebase of microbes and microbial function from the labelled knowledgebase of good and bad microbes containing only good prediction driving functional units;

receive an unknown microbe;

identify a nature of the unknown microbe using the context;

store the knowledgebase of microbes and microbial function with the good microbes based on the identified nature;

create a digital twin of a host-microbe-cancer crosstalk or interaction using the knowledgebase;

design a cocktail of microbes, microbial molecules and microbe modulating molecules using the knowledgebase of microbes and microbial function to be given to the person at risk for use over an intermittent fasting regimen, immediately before and after a fasting period, wherein the cocktail is configured to avoid initiation, progression and side effects of cancer; and administer the cocktail specific to a design meant for a specific type of cancer, wherein the administering of the cocktail is performed repeatedly for each intermittent fasting event that follows until one or more of the microbes have sustained in the host to yield a higher abundance in the fasting event as compared to a non-fasting event across multiple time points post cessation of the cocktail administration, wherein the cocktail is administered in at least one of the form as a topical ointment to be applied on exposed surfaces vulnerable to cancer or affected by cancer, paste or liquid or gel or powder or a spray or a roller form of application involving delivery of a layer on top of an affected site, an injection or probiotic and prebiotic supplements, wherein the processor implemented method is implemented for diagnosis or treatment of cancer without intervening an ongoing diagnosis or treatment.

11. A system of claim 10 further configured to assess and reduce the risk of cancer in the person using the knowledgebase of microbes and microbial functions, the system configured to:

obtain three or more samples from a body site of the person before the fasting event;

obtain three or more samples from a body site of the person after the fasting event;

extract, via a DNA extractor, one of microbial DNA, RNA, protein or metabolites from the obtained samples;

sequence, via a sequencer, the extracted DNA to get sequenced metagenomic reads;

create a biological feature abundance profile using the sequenced metagenomic reads, wherein the biological feature abundance profile refers to a number of times a biological feature specific one of microbial DNA, RNA, protein or metabolites is observed during sequencing;

provide the knowledgebase of microbes and microbial function;

calculate a ratio of abundance of microbes specific to the cancer using the knowledgebase across consecutive time points and median of time points corresponding to after the fasting event and before the fasting event;

plot a scatter plot, among the microbes identified during sequencing in the collected sample, of the ratio of abundance of microbes specific to cancer;

identify the person at risk if the slope of the scatter plot is negative.

12. The system of claim 11, wherein the biological feature corresponds to a microbe, a protein, a peptide, or a metabolite.

13. The system of claim 11, further comprising designing self-sustaining compositions aiming to administer microbes that can accelerate production of organic acids in the host, stabilize inside the host, and sustain an unsupported priming of general stress response in the other constituting microbes of the cocktail.

14. The system of claim 10, wherein further comprising designing supported compositions aiming at accelerated priming of general stress response in microbes of administered cocktail as well as microbes inside the host and inside the host's tumor or cancer.

15. One or more non-transitory machine-readable information storage mediums comprising one or more instructions which when executed by one or more hardware processors cause:

providing one or more microbial strains as a probiotic to a cancer host and a non-cancer host;

labelling, the one or more microbial strains into one of a good strain or a bad strain based on an impact on health of the cancer host and the non-cancer host;

performing, via a sequencer, a whole gene sequencing on the labelled good strain and the bad strains;

performing, via the one or more hardware processors, functional annotations on sequenced good strain and the bad strain to get a good and bad microbes' functional database;

filtering, via the one or more hardware processors, the good and bad microbes' functional database using a combination of a plurality of keywords in their names and the combination of the plurality of keywords are expected to pertain to microbial competition traits and have implications directly or indirectly in inhibiting or promoting cancer progression in collateral to competitive nature of microbes, wherein the filtering results in generation of a labelled knowledgebase of good and bad microbes with competition linked functional units;

performing, via the one or more hardware processors, genome clustering on the labelled knowledgebase of good and bad microbes using an unsupervised learning technique and validating if good and bad microbes are segregated on the basis of the competition linked functional units;

generating, via the one or more hardware processors, using a supervised machine learning technique:

a good microbe prediction model, a bad microbe prediction model, and functional units promoting competition against cancer;

learning, via the one or more hardware processors, a context whether a feature drives good microbe prediction or bad microbe prediction using Shapley additive explanations;

creating, via the one or more hardware processors, the knowledgebase of microbes and microbial function from the labelled knowledgebase of good and bad microbes containing only good prediction driving functional units;

receiving an unknown microbe;

identifying, via the one or more hardware processors, a nature of the unknown microbe using the context;

storing, via the one or more hardware processors, the knowledgebase of microbes and microbial function with the good microbes based on the identified nature;

creating a digital twin of a host-microbe-cancer crosstalk or interaction using the knowledgebase;

designing, via the one or more hardware processors, a cocktail of microbes, microbial molecules and microbe modulating molecules using the knowledgebase of microbes and microbial function to be given to the person at risk for use over an intermittent fasting regimen, immediately before and after a fasting period, wherein the cocktail is configured to avoid initiation, progression and side effects of cancer; and administering the cocktail specific to a design meant for a specific type of cancer, wherein the administering of the cocktail is performed repeatedly for each intermittent fasting event that follows until one or more of the microbes have sustained in the host to yield a higher abundance in the fasting event as compared to a non-fasting event across multiple time points post cessation of the cocktail administration, wherein the cocktail is administered in at least one of the form as a topical ointment to be applied on exposed surfaces vulnerable to cancer or affected by cancer, paste or liquid or gel or powder or a spray or a roller form of application involving delivery of a layer on top of an affected site, an injection or probiotic and prebiotic supplements, wherein the processor implemented method is implemented for diagnosis or treatment of cancer without intervening an ongoing diagnosis or treatment.

* * * * *